US012771777B1

(12) United States Patent
Rintz

(10) Patent No.: US 12,771,777 B1
(45) Date of Patent: Oct. 20, 2026

(54) REMOTE ACTUATOR AND INCIDENT COMMUNICATOR FOR EMERGENCY NOTIFICATION SYSTEMS

(71) Applicant: William J. Rintz, Hackettstown, NJ (US)

(72) Inventor: William J. Rintz, Hackettstown, NJ (US)

( * ) Notice: Subject to any disclaimer, the term of this patent is extended or adjusted under 35 U.S.C. 154(b) by 0 days.

(21) Appl. No.: 18/241,345

(22) Filed: Sep. 1, 2023

Related U.S. Application Data

(63) Continuation of application No. 18/197,685, filed on May 15, 2023, now abandoned.
(Continued)

(51) Int. Cl.

| | |
|---|---|
| ***H04M 1/72424*** | (2021.01) |
| ***H04M 1/02*** | (2006.01) |
| ***H04M 1/72409*** | (2021.01) |
| ***H04M 1/72412*** | (2021.01) |
| ***H04M 1/72439*** | (2021.01) |
| ***H04N 7/18*** | (2006.01) |

(Continued)

(52) U.S. Cl.
CPC ..... *H04M 1/72424* (2021.01); *H04M 1/0264* (2013.01); *H04M 1/724095* (2022.02); *H04M 1/72412* (2021.01); *H04M 1/72439* (2021.01); *H04N 7/185* (2013.01); *H04W 4/021* (2013.01); *H04W 4/10* (2013.01); *H04W 4/90* (2018.02); *H04M 2250/52* (2013.01)

(58) Field of Classification Search
CPC ......... H04M 1/72424; H04M 1/72412; H04M 1/72439; H04M 1/724095; H04M 1/0264; H04W 4/90; H04W 4/021; H04W 4/10; H04N 7/185
USPC .......... 348/158
See application file for complete search history.

(56) References Cited

U.S. PATENT DOCUMENTS

| | | | | |
|---|---|---|---|---|
| 8,378,808 B1 * | 2/2013 | Gwaltney | G08B 25/14 | 340/691.3 |
| 2013/0082837 A1 * | 4/2013 | Cosentino | G08B 25/016 | 340/539.12 |

(Continued)

*Primary Examiner* — Matthew David Kim
(74) *Attorney, Agent, or Firm* — Polley IP Law, P.A.

(57) ABSTRACT

A wearable remote actuator/incident communicator providing a remote control for emergency notification systems or acting on its own as emergency notifier. The Remote Incident Communicator (RIC) can preferably declare an emergency by depressing the actuator 3 times to send an initial alert and event location. The RIC can then send a 4 to 15 second recorded message directly to 911 or other monitoring agencies. After these initial actions, first responders can communicate with individuals on this network. The RIC can also be paired with a cell phone via Bluetooth and act as a remote panic button to give location and nature of emergency event by push notification to 911 or other agencies. The RIC can also have a camera for live-streaming video or only two-way audio communications with geo-tagging for location and talk to text receiving technologies. A stealth button allows the user to continue to communicate but shuts down all LED indicator lights and speaker functions. In stealth mode, Talk/Text messages can still be received. Preferably the RIC can be clipped on to a lanyard for easy accessibility/hands-free operation, though other attachments can be used such as clips, bands, Velcro etc. can also be used.

20 Claims, 29 Drawing Sheets

Related U.S. Application Data

(60) Provisional application No. 63/389,086, filed on Jul. 14, 2022.

(51) Int. Cl.

| | |
|---|---|
| ***H04W 4/021*** | (2018.01) |
| ***H04W 4/10*** | (2009.01) |
| ***H04W 4/90*** | (2018.01) |

(56) References Cited

U.S. PATENT DOCUMENTS

| | | | | |
|---|---|---|---|---|
| 2014/0139681 | A1* | 5/2014 | Jones, Jr. | G08B 27/001 348/159 |
| 2015/0124087 | A1* | 5/2015 | Jones, Jr. | G08B 15/02 348/143 |
| 2015/0297949 | A1* | 10/2015 | Aman | G06T 7/246 348/157 |
| 2016/0098138 | A1* | 4/2016 | Park | G06F 3/04886 345/173 |
| 2017/0193306 | A1* | 7/2017 | Robil | H04M 1/72457 |
| 2017/0238097 | A1* | 8/2017 | Wargon | G08B 7/064 381/152 |
| 2018/0113987 | A1* | 4/2018 | Zhu | G16H 40/63 |
| 2018/0295316 | A1* | 10/2018 | Callis, Jr. | H04N 23/661 |
| 2018/0324177 | A1* | 11/2018 | Wang | A61B 5/6803 |
| 2019/0373219 | A1* | 12/2019 | Sautner | G06V 20/46 |
| 2021/0158207 | A1* | 5/2021 | Alsahlawi | G06F 18/214 |
| 2021/0266392 | A1* | 8/2021 | Hernandez | G06F 3/165 |
| 2021/0360205 | A1* | 11/2021 | Alakarhu | H04N 7/188 |
| 2022/0225949 | A1* | 7/2022 | Umberger | G06F 21/6254 |
| 2023/0377449 | A1* | 11/2023 | Wilde | G08B 25/016 |
| 2024/0022928 | A1* | 1/2024 | Laurans | H04N 7/183 |
| 2024/0406701 | A1* | 12/2024 | Xu | H04W 4/029 |

* cited by examiner

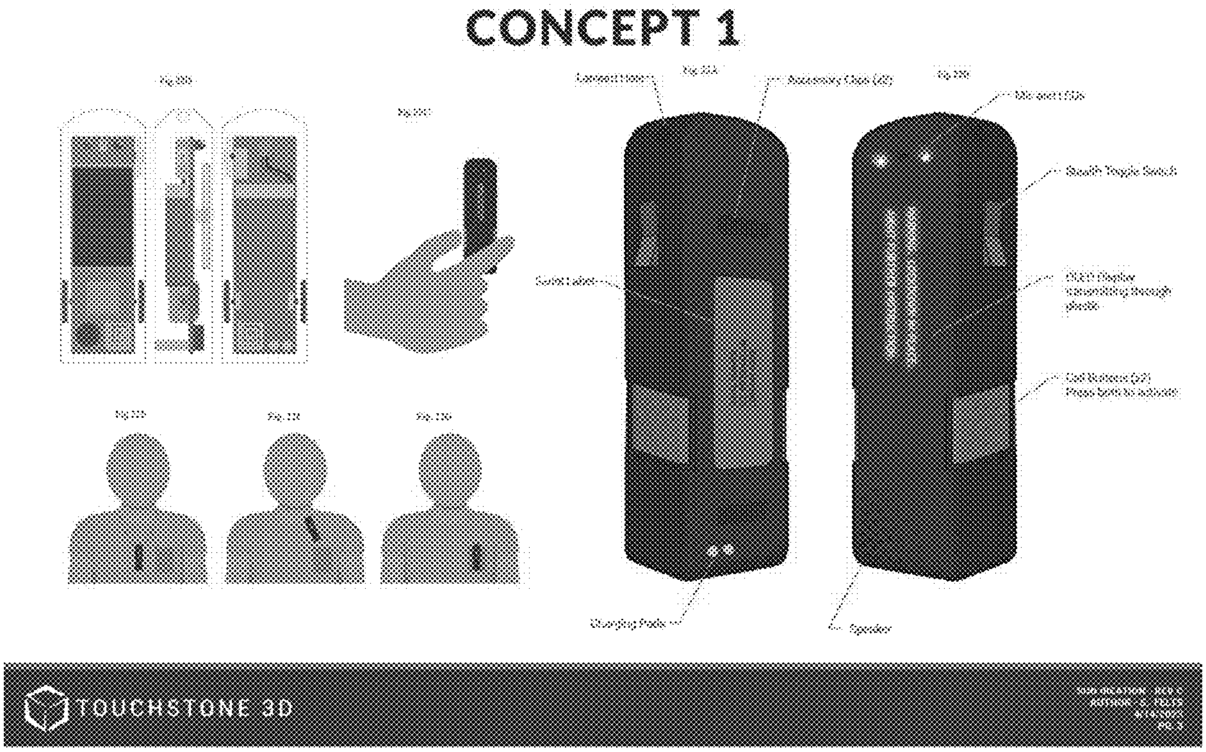
CONCEPT 1
TOUCHSTONE 3D

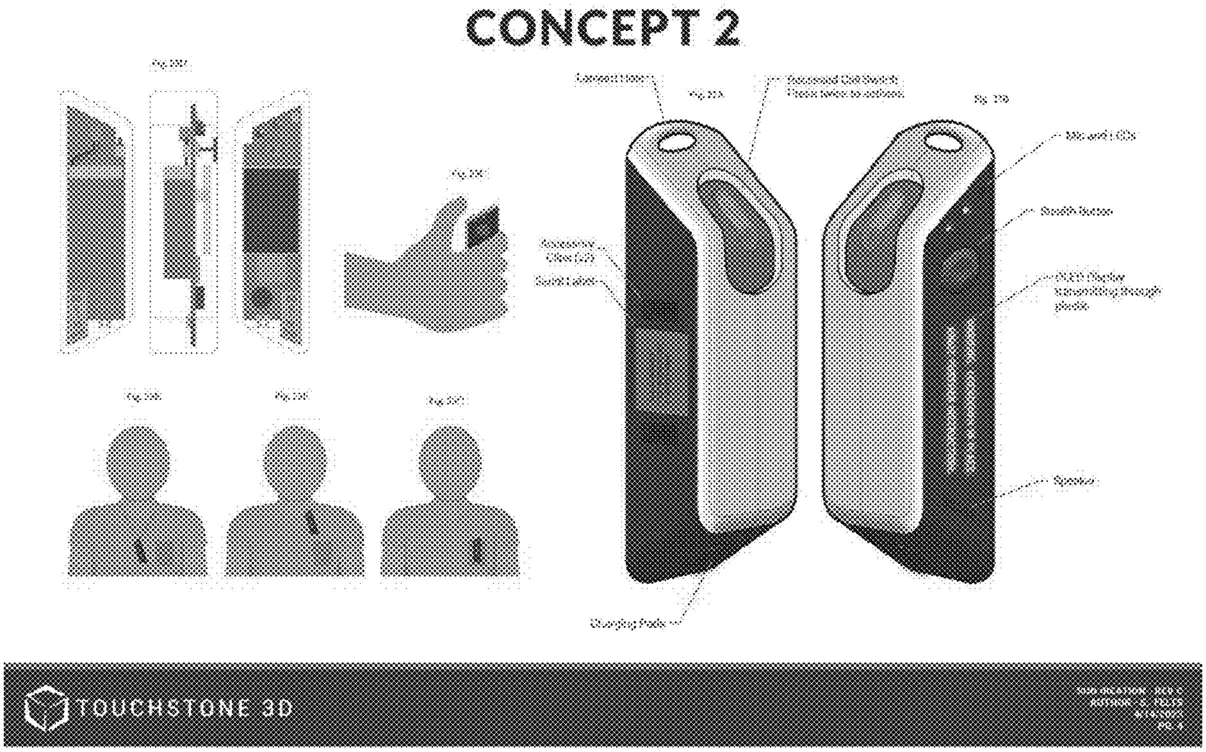
CONCEPT 2
TOUCHSTONE 3D

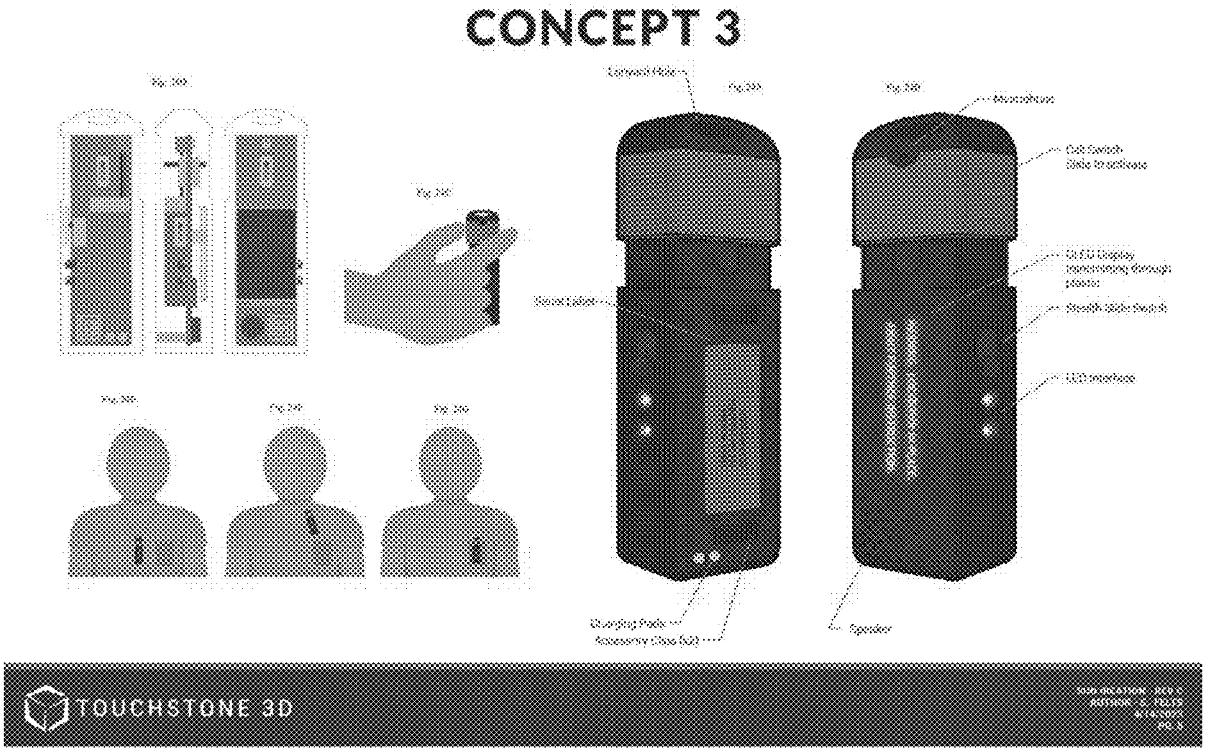
CONCEPT 3
TOUCHSTONE 3D

CONCEPT COMPARISON
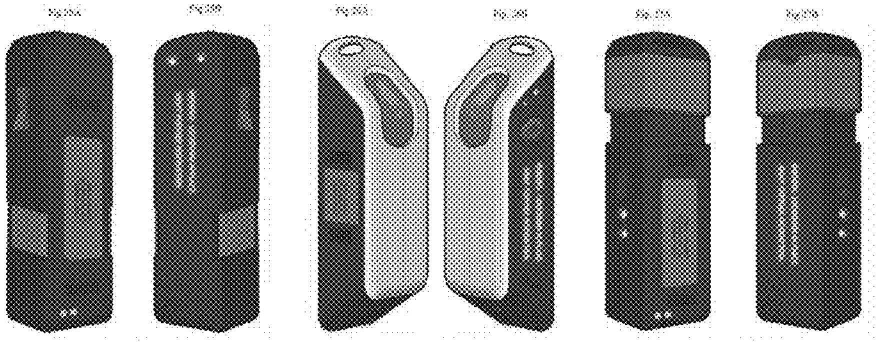
| | CONCEPT1 | CONCEPT2 | CONCEPT3 |
|---|---|---|---|
| Call Activation Method | Press Both | Press Twice | Slide |
| Call Action Subtlety | ✽✽✽ | ✽✽✽ | ✽✽ |
| Risk of Accidental Call | ✽✽✽✽ | ✽✽✽ | ✽✽✽✽ |
| Stealth Activation | Toggle Switch | Momentary Switch | Slide Switch |
| Development Costs | ✽✽✽ | ✽✽✽✽ | ✽✽✽✽ |
| Tooling Costs | ✽✽✽ | ✽✽✽✽ | ✽✽✽✽ |
| Unit Costs | ✽✽✽ | ✽✽✽✽ | ✽✽✽✽ |
TOUCHSTONE 3D

REMOTE ACTUATOR AND INCIDENT COMMUNICATOR FOR EMERGENCY NOTIFICATION SYSTEMS

This application is a continuation of U.S. application Ser. No. 18/197,685, filed May 15, 2023, which claims the benefit of and priority to U.S. Provisional Patent Application Ser. No. 63/389,086, filed Jul. 14, 2022. Both applications are incorporated by reference in their entireties for all purposes.

1. FIELD OF THE DISCLOSURE

The disclosure relates generally to emergency notification systems and discloses a novel wearable remote incident communicator for use with emergency notification systems

2. BACKGROUND

One common obstacle to developing a strategy for handling an emergency situation, such as, without limitation, a school shooting, hostage situation, etc., is the often inability for the responders to have real time video and images from within the location of the emergency and/or inability to be able to communicate with innocent persons located within the location. In an emergency, typically, the quicker the response, the better the outcome for victims. Every second could save a life. Though there have been some improvements in notification systems for emergency situations, there are still issues with gaps in areas that don't' have any coverage. The disclosed novel device and system is directed to providing a further improvement in notification systems and addressing, or at least reducing, the issues with gaps in coverage area found with current notification systems.

SUMMARY OF THE DISCLOSURE

A novel wearable remote actuator/incident communicator ("RIC") preferably for emergency notification systems is provided. Preferably the RIC can be a relatively small device that an individual can wear, such as, without limitation, clipped on their belt, contained in their pocket, attached by elastic armband, secured to a lanyard around the wearer's neck, etc.

In use, with the first sign of trouble; the individual wearer can press an emergency alert button, which can cause the device to send an emergency notification ping to a monitoring company to signify an emergency event has taken place. This action can also send a wireless signal to an emergency notification system that is in the immediate area such as an existing school or building. The novel RIC device can actuate an emergency lockdown and can communicate first hand video and push to talk messages directly to first responder radios. The device can be configured to a second notification ping that can immediately follow the first ping and can provide a monitoring company/location/agency the exact location of the RIC device. The individual can then record a 4 second audio/video file (the smaller and larger amounts of time can also be used and considered within the scope of the disclosure) that can automatically upload to the monitoring company which informs the company, inter alia, that (1). an emergency has been declared, (2.) the exact location and (3). audio/video description from the scene of the emergency. The monitoring company can then dispatch the appropriate resources to address the emergency (e.g. Active shooter, medical emergency, personal assault etc.) The remote RIC device can also be configured to then switch to video live-stream and two-way communication to provide real-time critical information to authorities so they can affect and coordinate the fastest, safest responses and rescues. With a SIM card, that is also preferably provided, the RIC device can acts as stand-alone device that can be monitored by a service, such that when the wear pushes the alert button, he or she can immediately speak to an operator at the monitoring company to quickly dispatch help wherever cell service is available.

Thus, a wearable remote actuator, incident communicator device is provided and preferably worn or carried by an individual for allowing the individual to send a notification to remotely located individuals, such as first responders, of an incident or emergency occurring at the geographical location/structure where the individual is located at. The communicator can also be in wireless communication with a notification system also located at the geographical location/structure and can cause one or more instant alert notifiers disposed within associated docking stations located throughout the geographical location/structure to activate a lockdown and begin recording or streaming video from their specific location within or at the geographical location/structure when the individual activates the incident communicator ("RIC"). The incident communicator can wirelessly transmit video to the emergency responders and can be provided with Push to Talk/Walkie-Talkie capabilities.

The novel disclosed RIC device can also be a relatively small remote control for an existing emergency notification system also located at the scene of the emergency/event. In one non-limiting embodiment, the novel RIC device can declare an emergency by depressing the actuator 3 times to send an initial alert and event location. The RIC can then send a 4-15 second recorded message directly to 911 or other monitoring agencies. After these initial actions, first responders can communicate with individuals on this network. The RIC can also be paired with a cell phone via Bluetooth and act as a remote panic button to give location and nature of emergency event by push notification to 911 or other agencies. The RIC can also have a camera for live-streaming video and/or two-way audio communications with geo-tagging for location and talk to text receiving technologies. A stealth button can also be provided to allow the user to continue to communicate, but that shuts down all LED indicator lights and speaker functions, to avoid detection by an assailant. In stealth mode, preferably Talk/Text messages can still be received. In one non-limiting embodiment, preferably the RIC can be clipped onto a lanyard for easy accessibility hands-free operation. However, other attachments can be used, such as, without limitation clips, bands, Velcro etc. and are also considered within the scope of the disclosure. Other electronic configurations for the RIC can incorporate 3G, 4G, 5G Wi-Fi.

Accordingly, the novel RIC described and shown herein, allows a user to move anywhere inside or outside a building and remotely actuate an existing emergency notification system on the premises, to declare an emergency and call for help. Preferably the RIC is small device that clips on a lanyard, and not as large or cumbersome as many two-way radios. The user can be provided with hands-free operation once activated and can also have a stealth mode. The RIC can also be paired with a cell phone and have unlimited coverage away from any existing emergency notification system. Once the RIC alerts and records a message, it can send a push notification via an emergency app on the phone directly to 911 or other emergency personnel.

BRIEF DESCRIPTION OF THE DRAWINGS

FIGS. 22A and 22B illustrates a non-limiting embodiment the RIC device and its various buttons, displays, lights, speakers, etc. in accordance with the present disclosure;

FIG. 22C illustrates a preferred size for the RIC device of FIGS. 22A and 22B, showing the device being able to be easily handheld;

FIG. 22D illustrates a non-limiting printed circuit board assembly that can be internally disposed within the RIC device of FIGS. 22A and 22B;

FIG. 22E shows the RIC device being worn by the user by lanyard;

FIG. 22F shows the RIC device about to being stored within the user's shirt pocket;

FIG. 22G illustrates the RIC device being clipped to the user's shirt pocket;

FIGS. 23A and 23B illustrates another non-limiting embodiment the RIC device and its various buttons, displays, lights, speakers, etc. in accordance with the present disclosure;

FIG. 23C illustrates a preferred size for the RIC device of FIGS. 23A and 23B, showing the device being able to be easily handheld;

FIG. 23D illustrates a non-limiting printed circuit board assembly that can be internally disposed within the RIC device of FIGS. 23A and 23B;

FIG. 23E shows the RIC device being worn by the user by lanyard;

FIG. 23F shows the RIC device about to being stored within the user's shirt pocket;

FIG. 23G illustrates the RIC device being clipped to the user's shirt pocket;

FIGS. 24A and 24B illustrates a further non-limiting embodiment the RIC device and its various buttons, displays, lights, speakers, etc. in accordance with the present disclosure;

FIG. 24C illustrates a preferred size for the RIC device of FIGS. 24A and 24B, showing the device being able to be easily handheld;

FIG. 24D illustrates a non-limiting printed circuit board assembly that can be internally disposed within the RIC device of FIGS. 24A and 24B;

FIG. 24E shows the RIC device being worn by the user by lanyard;

FIG. 24F shows the RIC device about to being stored within the user's shirt pocket;

FIG. 24G illustrates the RIC device being clipped to the user's shirt pocket;

FIGS. 25A and 25B further illustrate the RIC embodiment shown in FIGS. 22A and 22B with certain features for this RIC embodiment described underneath;

FIGS. 26A and 26B further illustrate the RIC embodiment shown in FIGS. 23A and 23B with certain features for this RIC embodiment described underneath;

FIGS. 27A and 275B further illustrate the RIC embodiment shown in FIGS. 24A and 24B with certain features for this RIC embodiment described underneath;

DETAILED DESCRIPTION

Figure 1:
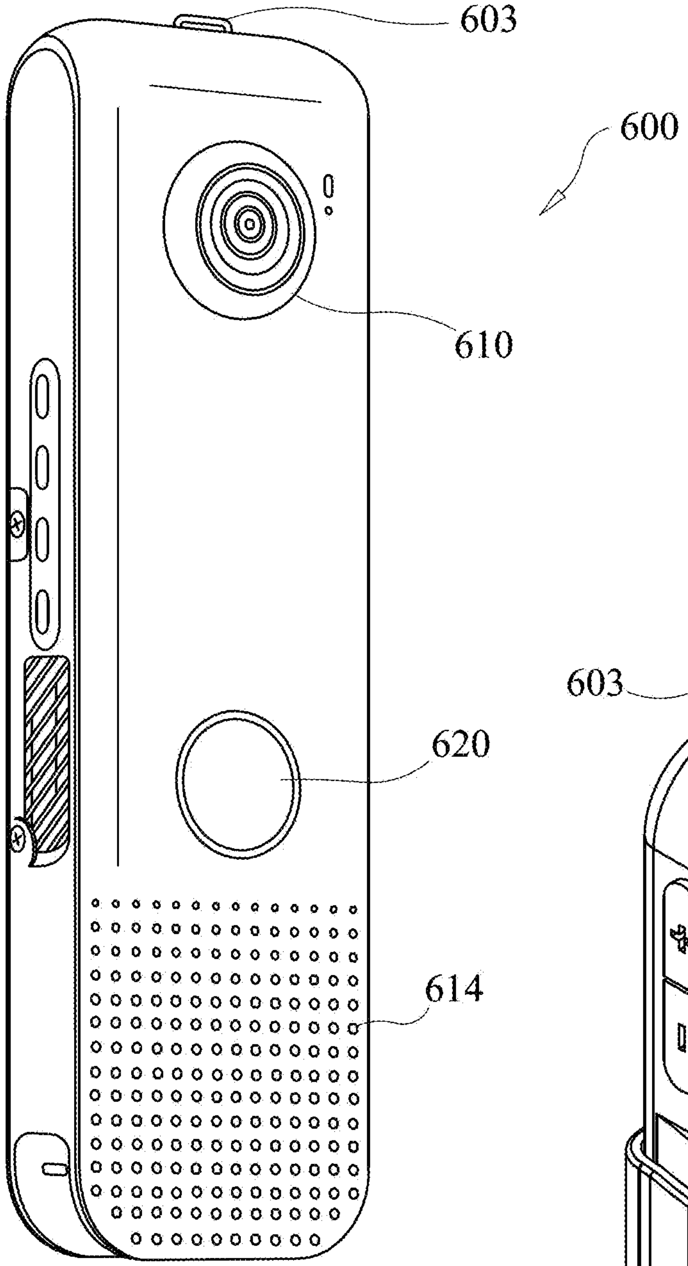
FIG. 1 is a front left perspective view of a first non-limiting embodiment for a novel wearable remote incident communicator ("RIC") in accordance with the present disclosure.
Figure 1A:
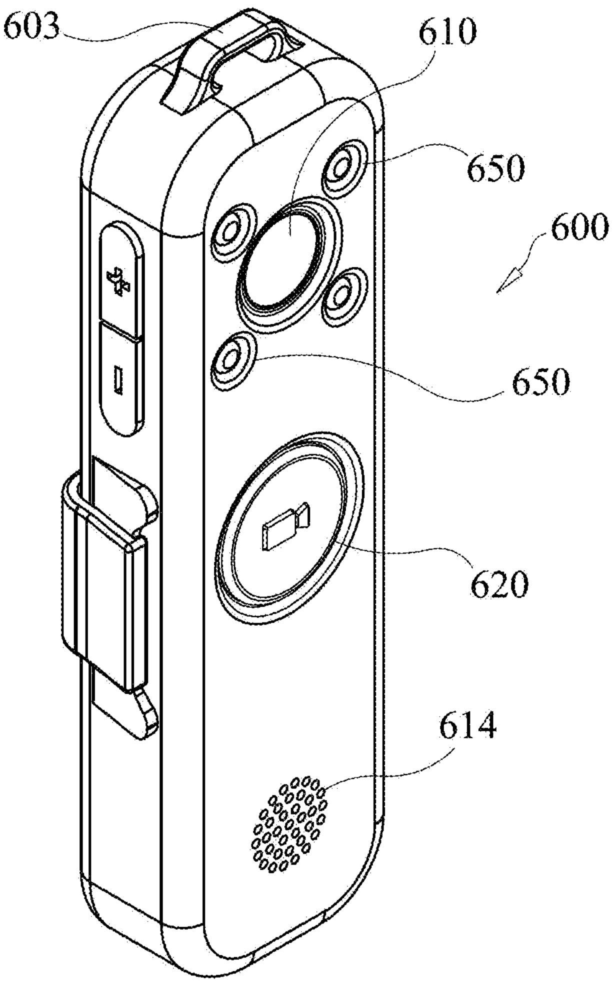
FIG. 1A is a front left perspective view of a further non-limiting embodiment for a novel wearable remote incident communicator ("RIC") in accordance with the present disclosure.
Figure 2:
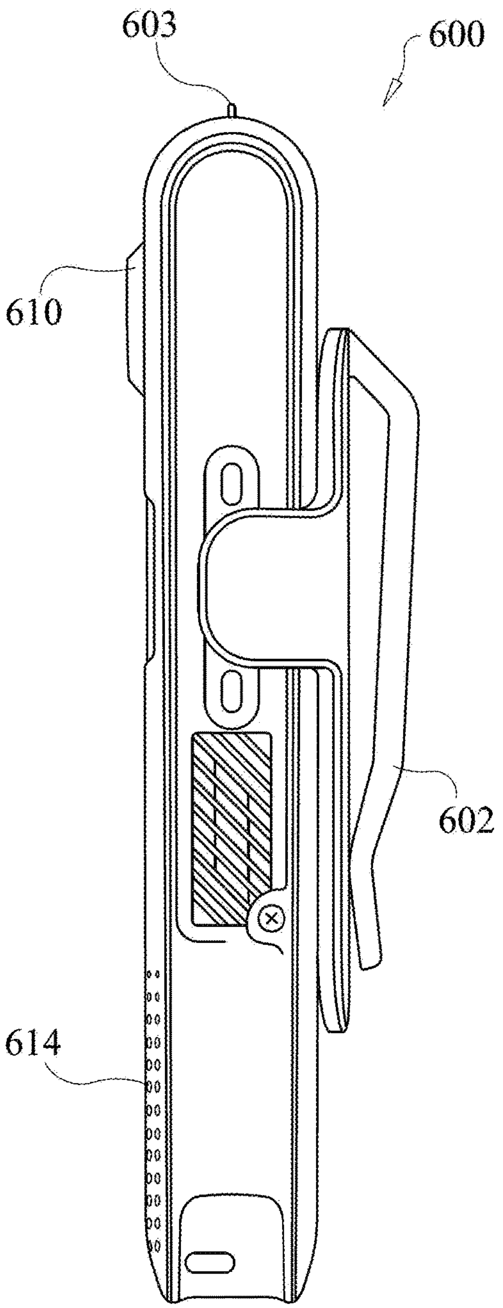
FIG. 2 is a front right perspective view of the novel wearable remote and incident communicator of FIG. 1.
Figure 2A:
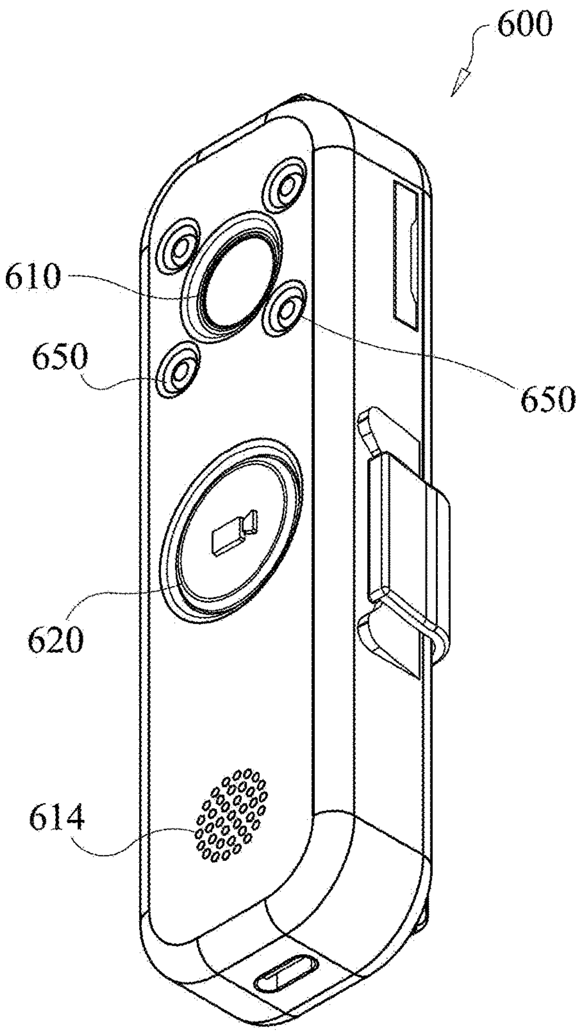
FIG. 2A is a front right perspective view of the novel wearable remote and incident communicator of FIG. 1A.
Figure 3:
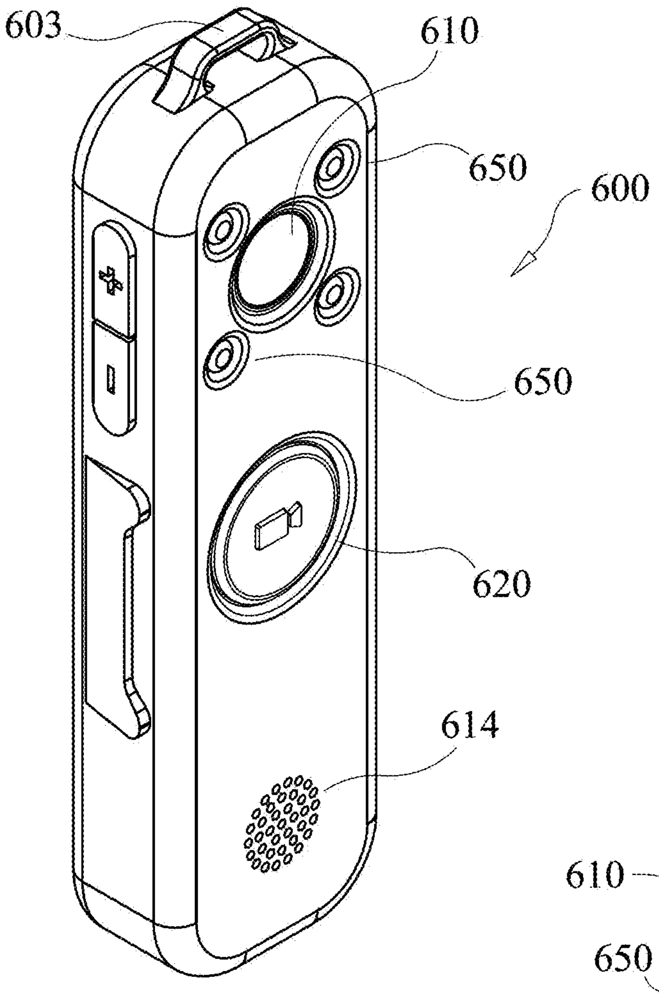
FIG. 3 is a front left perspective view of another non-limiting embodiment for a novel wearable remote incident communicator ("RIC") in accordance with the present disclosure.
Figure 4:
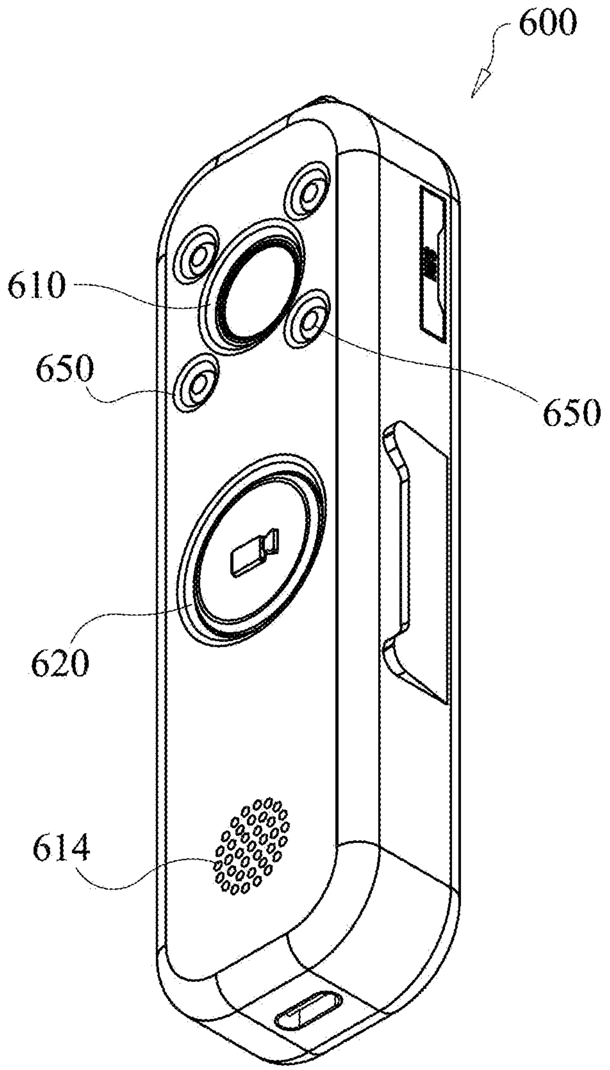
FIG. 4 is a front right perspective view of the novel wearable remote and incident communicator of FIG. 3.

As seen in FIGS. 1 and 2 a first non-limiting embodiment for a novel wearable remote actuator/incident communicator ("RIC") is shown. Though not considered limiting, the novel communicator can be used with an emergency notification system, such as, my novel notification system described in my U.S. Pat. No. 11,217,073 B1 entitled INSTANT ALERT NOTIFIER AND DOCKING STATION. The communicator can also be used with other communication systems and other emergency notification systems and the operation and components of all of the emergency notification systems are incorporated by reference.

I incorporate by reference the entire disclosure (specification, claims, abstract, drawings and any exhibits) for U.S. application Ser. No. 17/236,113, filed Apr. 21, 2021 and entitled INSTANT ALERT NOTIFIER AND DOCKING STATION as if fully set forth herein, which issued into the above-noted U.S. Pat. No. 11,217,073 B1 and the issued patent version is also incorporated by reference in its entirety as if fully set forth herein.

As generally seen in the Figures, the RIC communicator is preferably worn or carried by the user on their person, so that it is readily available in the event of an emergency situation, and which also addresses the situation where the person is unable to reach a wall mounted communicator (i.e. within a docking station, etc.) based on the nature of the emergency. In one non-limiting embodiment, a clip can be provided for securing the communicator to an article of clothing, belt, hat, backpack, purse, etc. of the person. Alternatively, a lanyard, chain, rope, cord, wire, etc. can be used to secure the communicator around the neck of the person. Additionally, a ring can be used for securing the RIC unit. Other conventional securement mechanisms, items, etc. can also be used and all are considered to be within the scope of the disclosure.

Preferably, the communicator can be provided with a camera for recording, storing, forwarding and/or streaming video and for capturing/forwarding images and can be provided with a microphone/speaker for capturing audio and for communications with other individuals. A button or a plurality of buttons can be provided for initiating camera recording, notification to the emergency system, etc., as well as any other desired function. The communicator can also be provided with electronics and storage for storing/forwarding/capturing/streaming of the video/images, for wireless communication with other communicators and/or the emergency system. The communicator can be similarly used and have similar electronics/components to the wall mounted notifier described in the above-identified INSTANT ALERT NOTIFIER AND DOCKING STATION application. Preferably, the communicator can be provided with a rechargeable battery, though other types of batteries can also be used and are also considered within the scope of the disclosure.

The disclosed RIC devices act as a remote actuator/incident communicator that can alert or trigger an emergency event on an existing notification system located on the premises or act as a stand-alone device for directly trigger or initiate an emergency event (i.e. without communication with any other existing notification system on the premises, if any) and can communicate with individuals inside and outside of the event.

The RIC devices can use existing networks and technology, which can also include using LTE, 3G, 4G, 5G. Furthermore, The RIC device can be configured to operate in open systems, closed systems, mesh-networks and can be configured using software. The RIC device can accomplish different tasks to meet requirements where the systems are installed. In certain embodiments and/or configurations, a SIM card can be installed, particularly where the RIC device is intended to operate independently (i.e. doesn't work in conjunction with another notification system also located on the premises/scene where the emergency is taken place) for unlimited coverage. The RIC device can be configured such that one of the buttons provided on the RIC device can be used for a "push to talk" ("PTT") function. The RIC device can also be configured such that holding the record button for a non-limiting predetermined period (e.g. 3 seconds, etc.) can cause the RIC device to start recording and then be available for PTT afterwards. Thus, in addition to its stand-alone/independently operated capabilities, the RIC devices can also act as a remote actuator to start instant alerts in emergency notification systems that are permanently fixed into structures or removable device notification systems such as my Instant video alert notifier system identified above.

When an alert button (which can be Red in color-though non-limiting) on the RIC device is depressed; preferably 30 seconds (though non-limiting and shorter or longer time periods can be configured and are within the scope of the disclosure) of the pre-event (i.e. 30 seconds prior to when the button was pressed) can be automatically saved to the cloud. This action can also send a "emergency notification ping" to monitoring companies, police departments or others that an emergency event has been declared. Preferably, this action can then be followed (preferably immediately) by a second "location ping" preferably providing the physical address and specific location information of the event/emergency to first responders. Preferably simultaneously the device can also record 4 seconds or other predetermined time period (smaller or larger) of an audio/video file that can be instantly or virtually instantly uploaded to the monitoring companies or police departments or others. The audio file can serve as an initial declaration of an emergency event. Samples of statements that can be preprogrammed or stated, include without limitation examples such as "I just saw someone enter the side door of the building with a gun" "I think I'm having a heart attack please send help" "I smell smoke on the third floor" etc. With the preferred accompanying video also recorded by the RIC device; a relatively quick, custom-tailored response for the emergency event can be provided. Authorities can know exactly what the situation is currently and can have real-time monitoring as the crisis unfolds. Thus, preferably, depressing of a red alert button, 30 seconds of pre-event footage can be saved to cloud storage. This action can also actuate and trigger a lockdown event to all other notification devices or other devices in emergency notification systems located within the structure or premises of the emergency event.

After the initial sequence of use, the RIC device can now record or live-stream additional video and with the Push-To-Talk (PTT) feature users can give critical real-time information to first responders. Users can also receive real-time information from the first responders. The RIC device can also be configured using software for custom features to meet requirements where the RIC devices/systems are installed or to be used. This can also include providing language translation software. The RIC device can also be equipped with a SIM card drive that allows it to operate independently with unlimited coverage.

FIGS. 1 through 8 illustrate a novel wearable remote incident communicator ("RIC") 600 that can be preferably used with an instant alert notifier and docking station system, including, without limitation, the instant alert notifier system embodiments described above and shown in FIGS. 1-26. However, it is also within the scope of the disclosure that the novel wearable communicator 600 can be used with other emergency notification systems and other types of notification systems and can also be used as a stand-alone device.

Communicator 600 can be preferably worn or carried by the user on their person, so that it is readily available in the event of an emergency situation or other event requiring immediate or relatively quick action, and which also addresses the situation where the person is unable to reach a wall mounted communicator (i.e. within a docking station, etc.) based on the nature of the emergency. In one non-limiting embodiment, a clip 602 can be provided for securing the communicator to an article of clothing, belt, hat, backpack, purse, etc. of the person. Alternatively, a lanyard, chain, etc. that is connected/secured to the housing/body of communicator 601 can be used to secure communicator 600 around the neck of the person, held in the hand of the user, secured to another item carried by the user (e.g. backpack, purse, etc.), armband, etc., Additionally, a ring can be used for securing the RIC unit. Other conventional securement mechanisms, items, etc. can also be used and all are considered to be within the scope of the disclosure.

Preferably, communicator 600 can be provided with a camera or camera module 610 for recording, storing, forwarding and/or streaming video and for capturing/forwarding images and can be provided with a microphone/speaker 614 for capturing audio and for communications with other individuals. A button or a plurality of buttons 620 can be provided for initiating camera recording, lockdown notification to the emergency system, etc., as well as any other desired function. Pressing button 620 can cause the record switch 622, preferably aligned with button 620, to start the camera recording, notification initiation, etc. Communicator 600 can also be provided with electronics or electronic/electrical components 630 and storage for storing/forwarding/capturing/streaming of the video/images, for wireless communication with other communicators and/or the emergency system. Communicator 600 can be similarly used and have similar electronics/components to the wall mounted notifier described in the notification system discussed in FIGS. 1 through 26, or with other notification systems. Preferably, communicator 600 can be provided with a rechargeable battery, though other types of batteries can also be used and are also considered within the scope of the disclosure.

Figure 5:
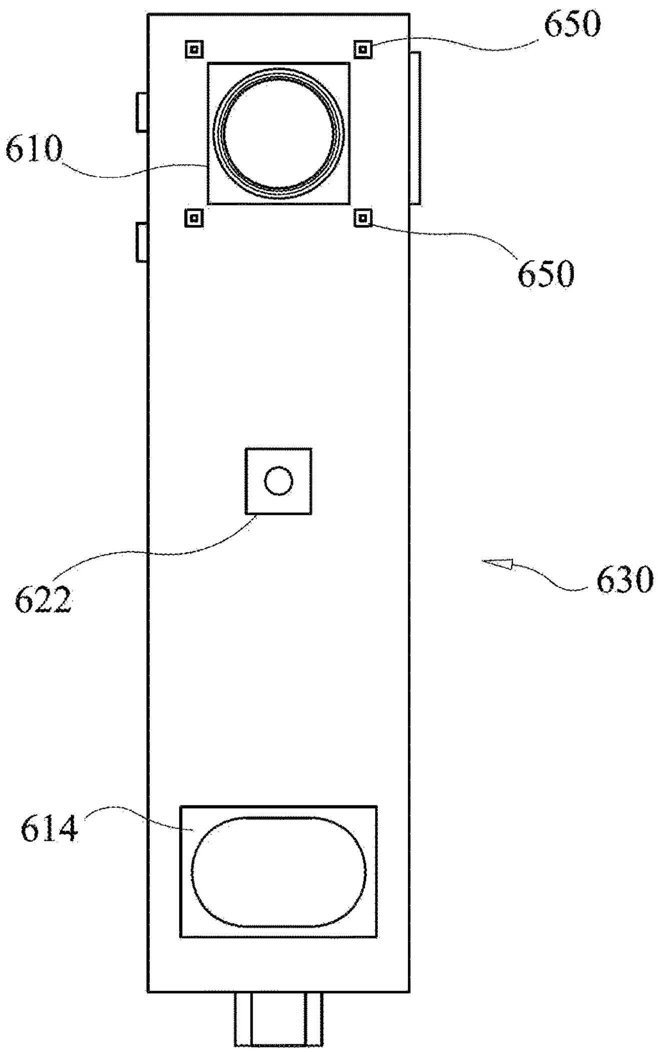
FIG. 5 is a front view of a non-limiting printed circuit board assembly embodiment for any of the RICs disclosed or shown herein.
Figure 6:
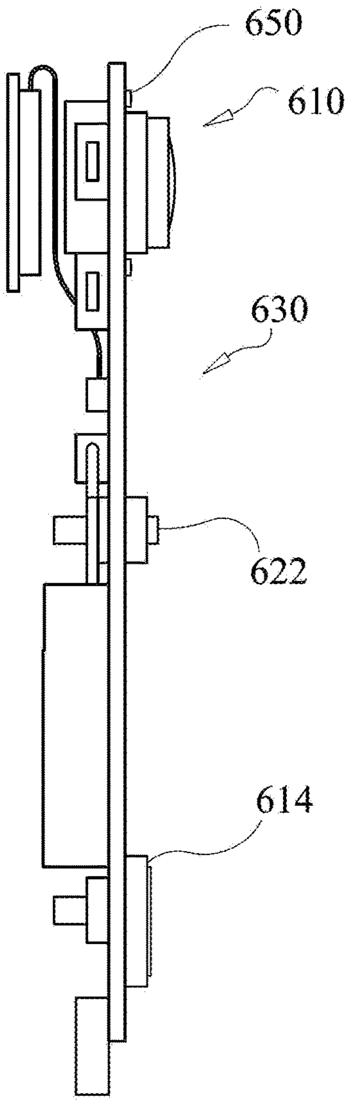
FIG. 6 is a side of the printed circuit board assembly embodiment of FIG. 5.
Figure 7:
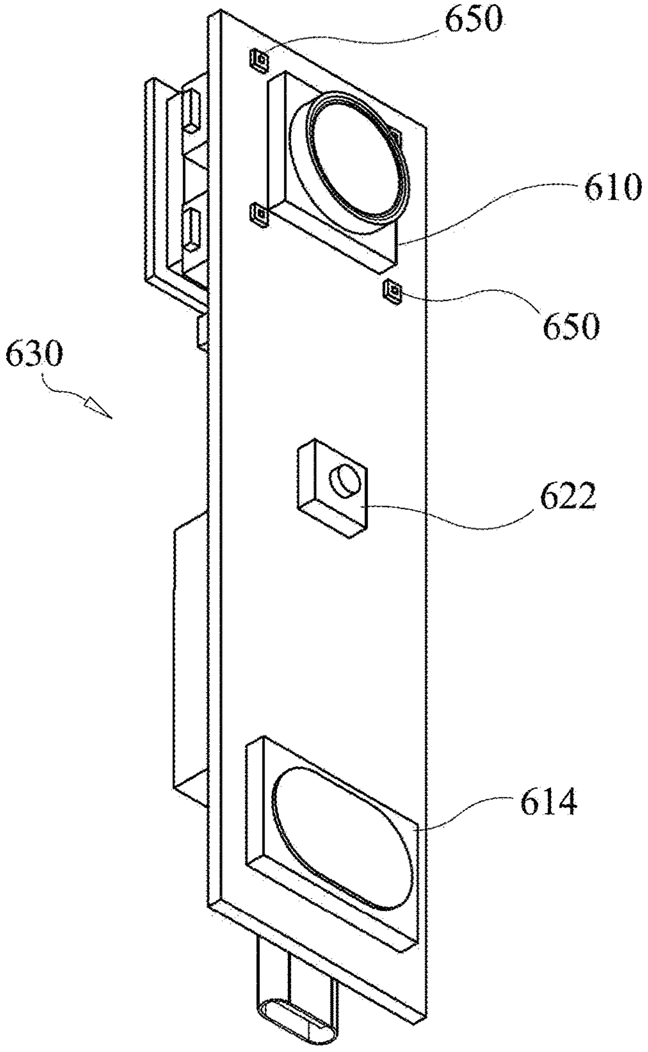
FIG. 7 is a left perspective view of the printed circuit board assembly embodiment of FIG. 5.
Figure 8:
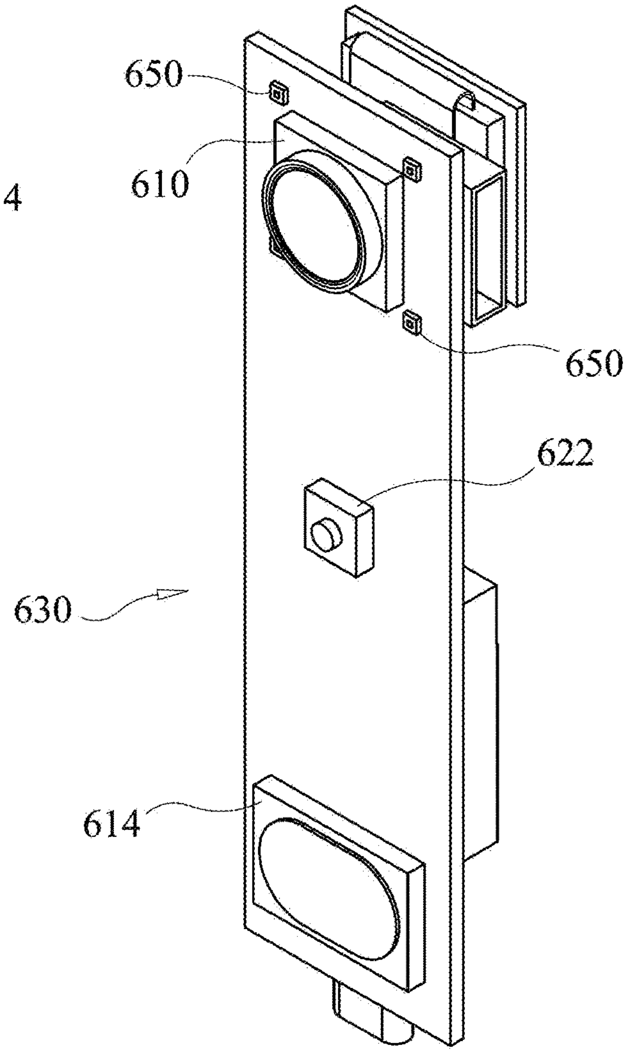
FIG. 8 is a right perspective view of the printed circuit board assembly embodiment of FIG. 5.
Figure 9A:
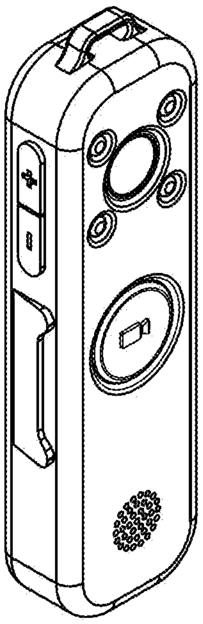
FIGS. 9A, 9B and 9C are perspective views illustrating non-limiting ways for securing the RIC to the person or for wearing the RIC, such as, without limitation, through a lanyard, through a clip.
Figure 9B:
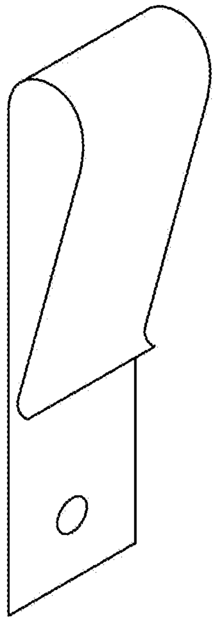
Figure 9C:
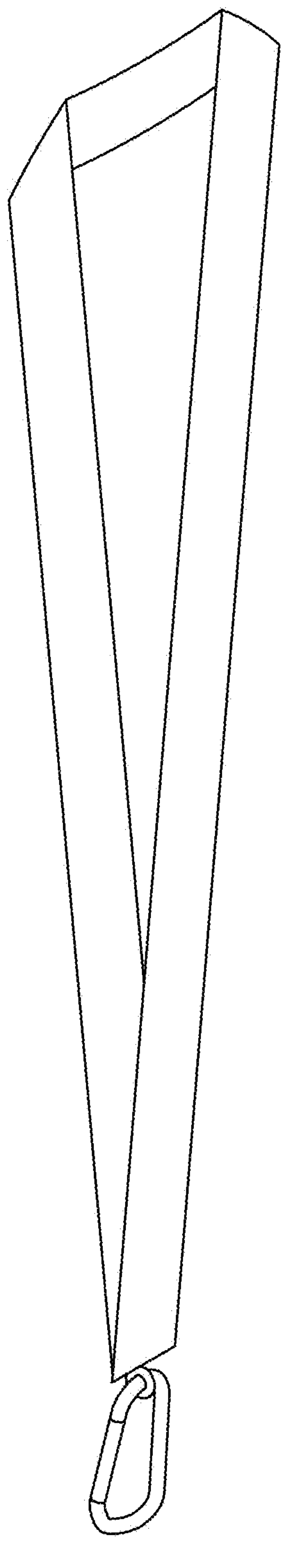
Figure 10A:
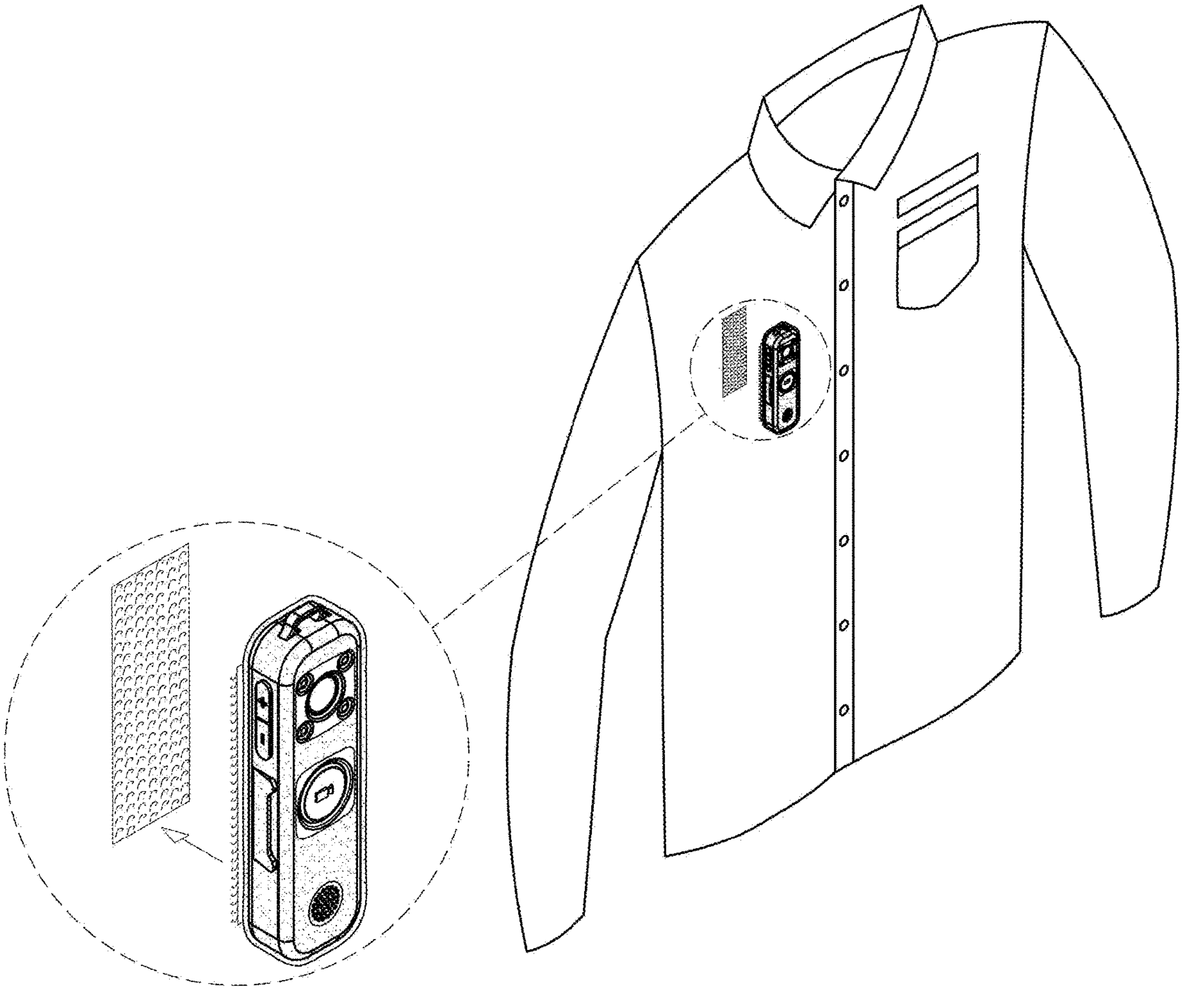
FIGS. 10A and 10B illustrate a further non-limiting embodiment where a cloth cover can be provided to go around the RIC and using hook and loop fasteners (VELCRO) on the cloth cover or directly on an outer surface of the RIC housing (where no cloth cover is provided) to removably secure the RIC to a scrub uniform and/or other clothing or objects.
Figure 10B:
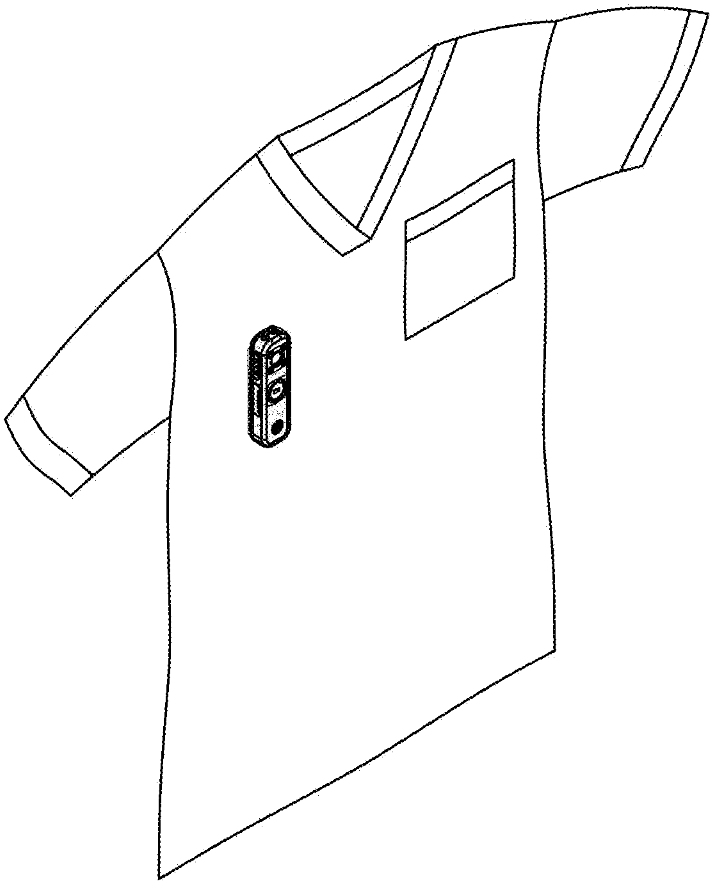

As seen in FIGS. 5-7, a non-limiting embodiment for an internal printed circuit board assembly 630 is shown and can be provided and show several electrical/mechanical components and features for the novel remote actuator/communicator including, without limitation, LEDs, volume switches, camera module, record switch, speaker, SIM card reader, LCD display, microphone, push to talk switch, stealth switch and USB receptacle (preferably Type C). One or more of these components can be aligned with associated buttons, openings, windows, etc. contained on one or more of the housings for the various non-limiting RIC embodiments shown in the drawings.

Certain novel features, benefits and/or advantages of wearable remote incident communicator 600 can include, without limitation:

1. In any emergency or other situation, communicator 600 can be programmed to a push-to-talk ("PTT") mode or full emergency mode and can allow the user to instantly communicate with or to a monitoring company, campus police, administrative office, etc. to report activity or any other desired personnel, such as, first responders, through direct communication or in conjunction with a notification system/emergency notification system. In one non-limiting example, the user can press and hold a RED record button 620 (though other colors can also be used and are considered within the scope of the disclosure) for 3 seconds (though other time periods can also be used and are considered within the scope of the disclosure) to begin the recording and/or wireless transmittal of a message, the event and/or start live stream video mode. Other functions can also be configured to begin or initiated by the pressing of button 620, and the operating software for the electronics 630 can be configured to cause the communicator to perform various operations based on how long button 620 is pressed down, how many consecutive times button 620 is pressed, etc. Non-limiting example messages and key words that can be transmitted can include-"Police Emergency" "Active Shooter Emergency" "Medical Emergency" "Student Fight", "Fire", etc.

2. Once an emergency and/or other triggering event is declared, one or more, and preferably all other, RICs in the building and/or associated with the premises (i.e. school playground, college campus, business campus, etc. and can begin to flash a blue LED (though other colors can be used and are considered within the scope of the disclosure) and vibrate. Other notifiers, such as wall-mounted notifiers residing in docking stations, can also be triggered. Preferably, the other RICs 600 are worn or carried by other individuals associated with the school or other operation (i.e. governmental, business, etc.) located within the building and those individuals can remove their associated RIC from their belts or lanyard and put the unit up to their ears to listen to the message that was recorded from the primary user. If events are also occurring at their specific location, such other individuals can also begin to record/stream/broadcast video/images/audio from their particular locations.

3. A button on the side of the communicator (or other location on the communicator) can be pushed by the user to talk with others using a two-way communication feature.

4. A port on the side of the communicator (or other location on the communicator) can be provided and can be used for a USB-C connector to recharge the unit. Other types of recharging ports can also be included and are considered within the scope of the disclosure and other uses for the port(s), in addition to recharging the communicator.

5. The communicator can be provided with a built-in microphone and speaker 614.

6. The communicator can be provided with a light bulb which when activated can signal that an incident has occurred or is occurring. In one non-limiting embodiment, the light bulb can be a Blue LED to alert incident, though other types of bulbs and colors for the bulb can also be used and are considered within the scope of the disclosure. One or more LEDS 650 or other bulbs can be provided and based on configuring the operational software can be made to flash or stay on in multiples, patterns, etc. to indicate different messages.

7. Preferably, an unlimited number of RIC 600 units can be paired with an instant video alert notifier for an emergency notification system and/or directly with the emergency notification system/notification system, with the instant video alert notifiers preferably located in hallways, foyers, main entrance and exits (i.e. in non-classroom locations as the RICs can be preferably worn by teachers, aides, student(s), etc. in the classrooms in a preferred non-limiting use embodiment) for the schools or other buildings. The RIC 600 units can also be paired with other devices such as smart smoke alarms, defibrillators (wherein remove a defibrillator alerts medical personnel through the RIC communication that a medical emergency is occurring), etc. to create a highly effective security/safety mesh-network.

8. The back of the RIC unit (or other location on the unit) can be provided with a stealth mode button.

9. The RIC unit can be Geo-Tagged so Police and first responders can track the movement in a building. Additionally, video and images that are streamed and broadcasted remotely to others can also be geo-tagged so that the reviewing individuals know exactly where the incident is occurring within the building/premises.

10. The RIC unit can be provided a belt clip 602 and/or a ring/loop 603 on the top to connect to a lanyard for personal use or to an elastic arm band.

11. As referenced above, preferably the RIC unit 600 can be provided with a rechargeable battery, though such is not considered limiting and non-rechargeable batteries can also be used and are considered within the scope of the disclosure.

In a preferred non-limiting use, remote actuator/communicator 600 can alert or trigger an emergency event on a notification system and can communicate with individuals inside and outside of the event. Existing communication networks and technology can be used, including, without limitation, LTE, 3G, 4G, 5G. Open systems, closed systems and can be configured using software that can accomplish different tasks to meet requirements where the systems are installed. A SIM card can also be provided/Installed in communicator 600 and communicator can also be designed to also operate independently with unlimited coverage.

Record button 620, can also be used for Push to Talk ("PTT") capabilities. In one non-limiting example, button 620 can be held/pressed for 3 seconds (or other configured or programmed time period) to start recording and then be use for PTT functions afterwards. Communicator 600 can be used as a remote actuator to start instant alerts in emergency notification systems that are permanently fixed into structures or removable device notification systems such as, but not limited to, the Instant video alert notifier system described for FIGS. 1-26.

Preferably, with the depressing of Once the Red Alert button 620; 60 seconds (or other amount of time) pre-event video can be automatically saved to the cloud or other analog or digital storage component. This action can also send a "emergency notification ping" to monitoring companies, police departments or others that an emergency event has been declared. This can also be followed immediately or relatively quickly thereafter, by a second "location ping" giving physical address and specific location information to first responders. Simultaneously, communicator 600 can also record 4 seconds or other predetermined time period of an audio/video file that can be virtually instantly uploaded to monitoring companies, police departments or others. The audio can be an initial declaration of an emergency event. Non-limiting sample descriptions that can be sent include: (i) "I just saw someone enter the side door of the building with a gun", (ii) "I think I'm having a heart attack please send help", (iii) "Help I'm Being Attacked", (iv) etc.

With the accompanying video; the short description can be provided for a relatively quick, custom-tailored response to or for emergency events. Authorities/responders will know exactly the location, what the situation is currently and can have real-time monitoring as the crisis unfolds, as well as receive further information from the notification system that communicator 600 is used with.

After the initial sequence of use, communicator 600 can be used to record or live-stream additional video and with the Push-To-Talk (PTT) feature, users can give critical real-time information to first responders and the users can also receive real-time information, instructions, etc. from the first responders.

Language translation software can also be provided such that communicator(s) 600 can be used in non-English speaking countries or in areas where English is not the primary language spoken. Thus, communicator 600 can be configured/programmed/designed to operate in any spoken language. As noted above, communicator 600 can also be provided or equipped with a SIM card drive that allows it to operate independently with unlimited coverage.

Activation of communicator 600 (i.e. pressing of button 620) by the user associated with communicator 600 (or another individual at the same geographical location) can also cause the notifiers of the notification system described in FIGS. 1-26 residing in their assigned docking stations to also activate and begin recording and/or transmitting video, photos and/or audio from their specific locations.

Figure 20:
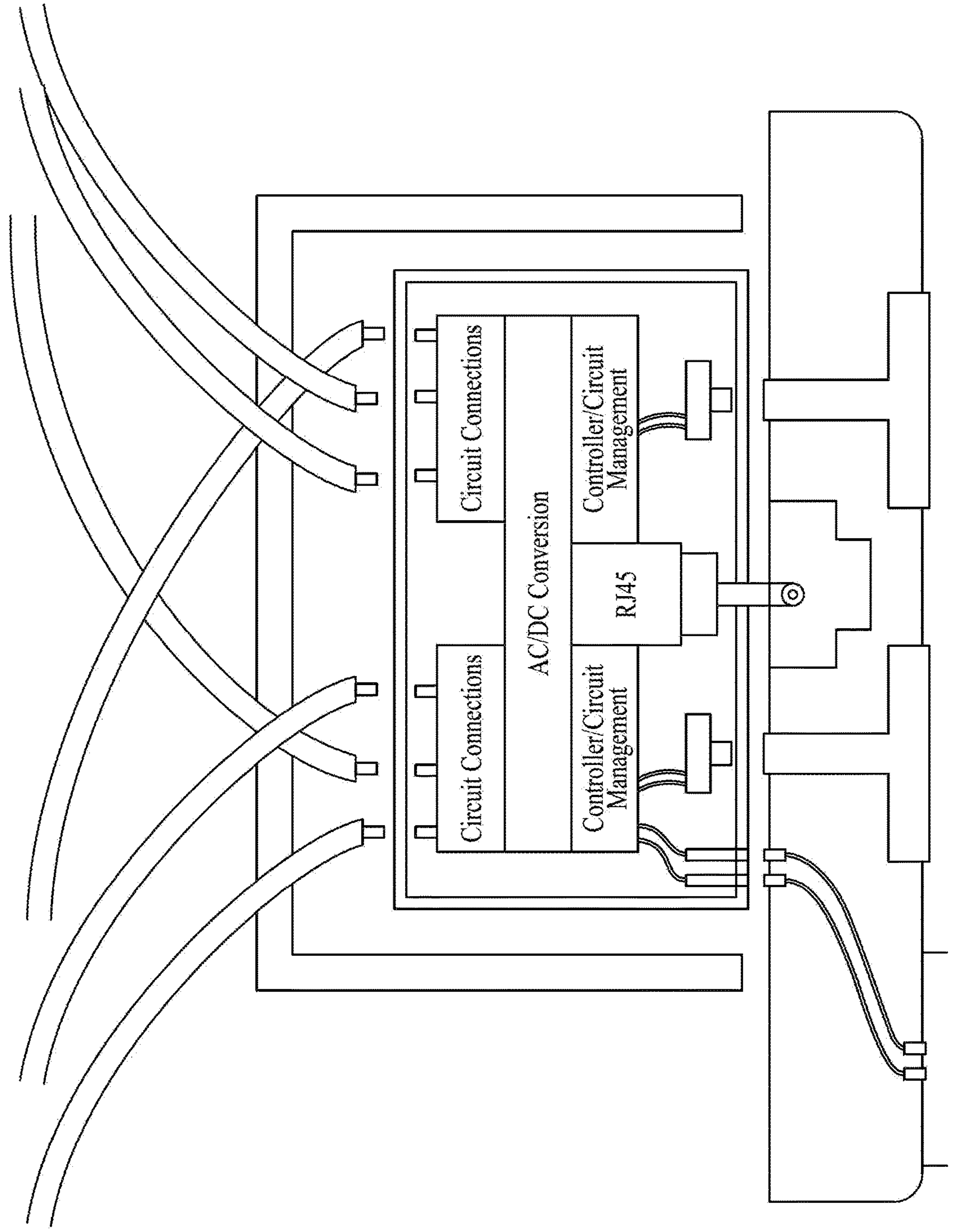
FIGS. 20 and 21 illustrates a non-limiting embodiment for a wall charger as one non-limiting manner for charging the RIC.
Figure 21:
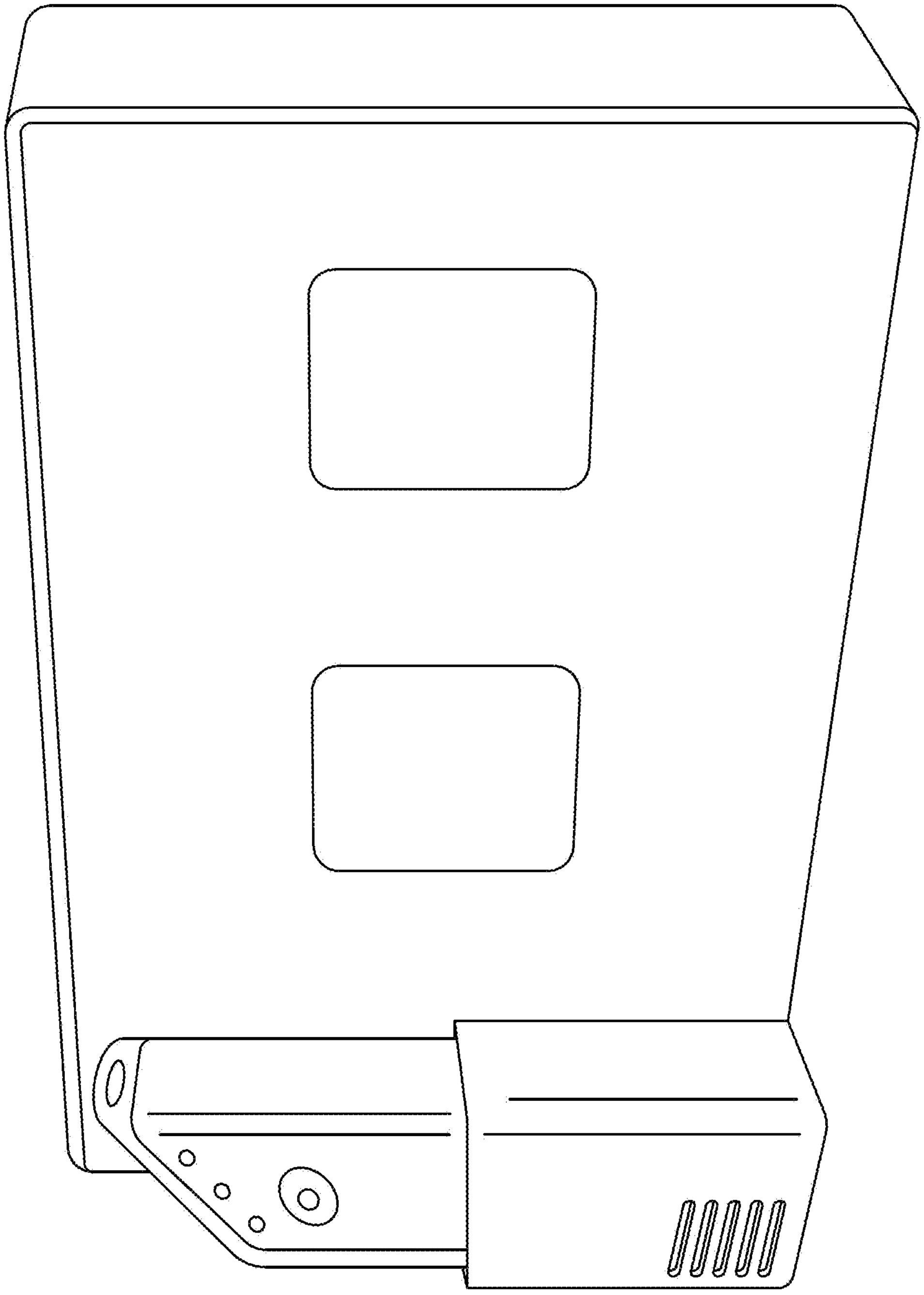
Figure 28:
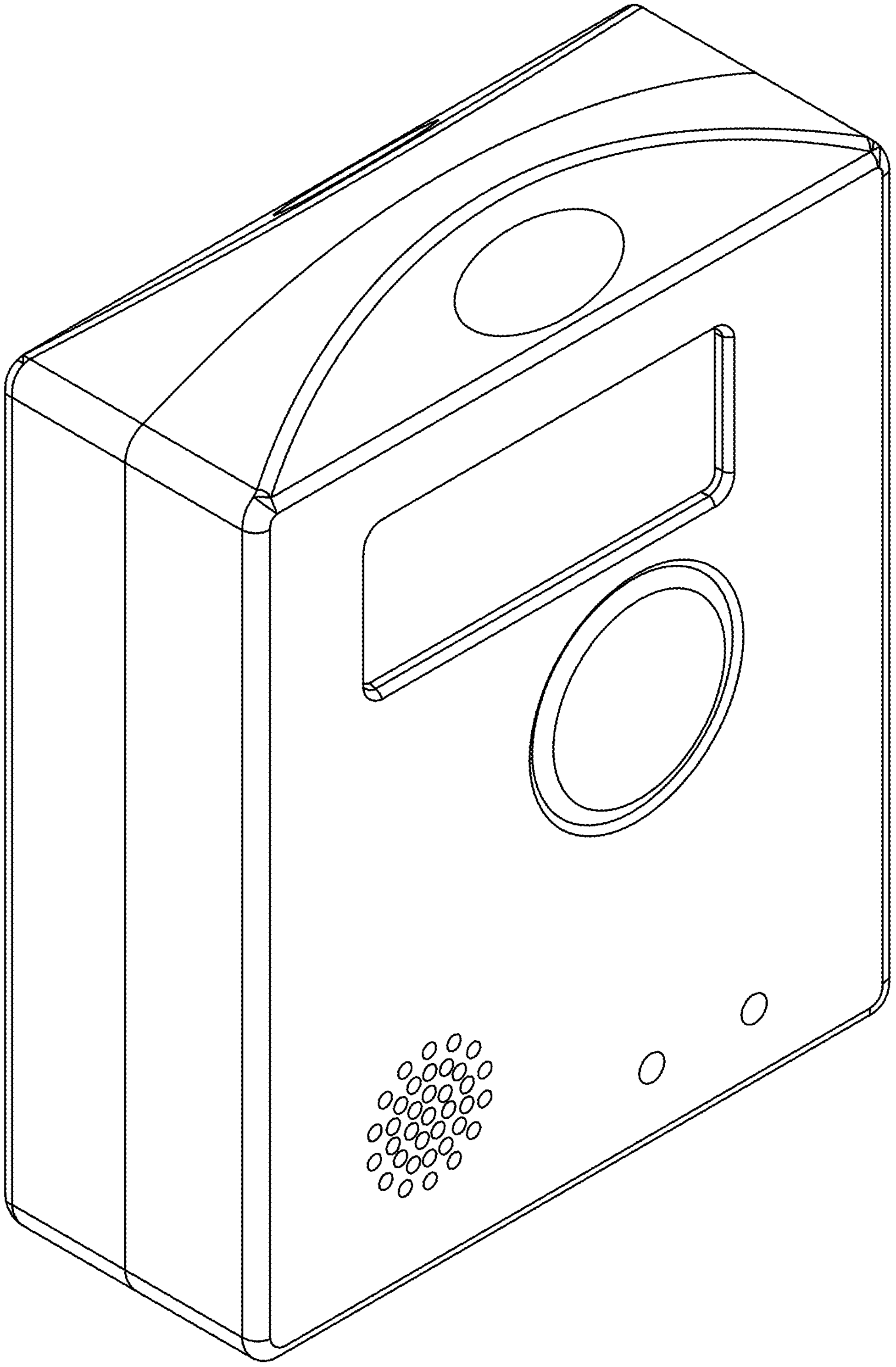
FIGS. 28, 29, 30 and 31 illustrate several external views for another RIC embodiments in accordance with the present disclosure.
Figure 29:
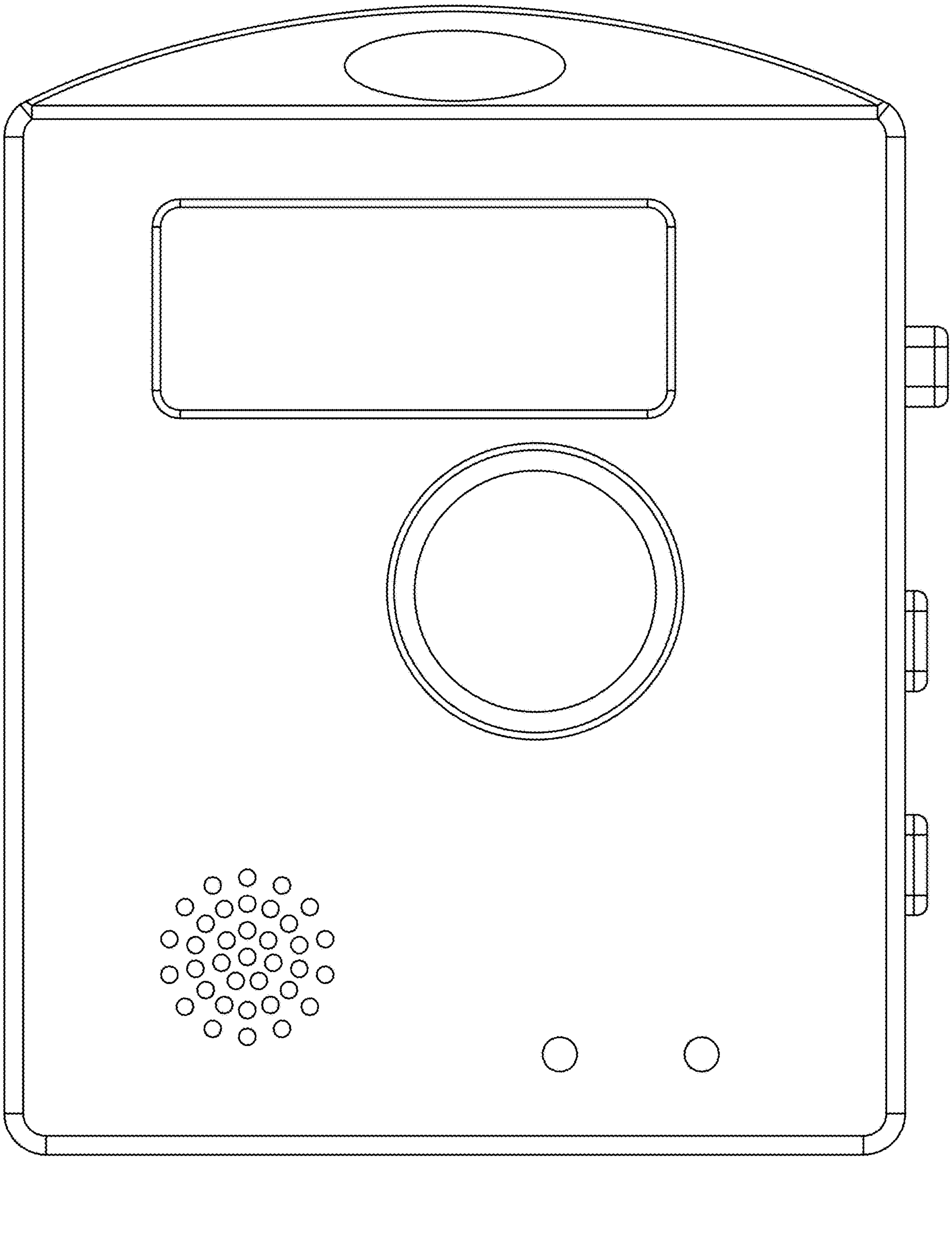
Figure 30:
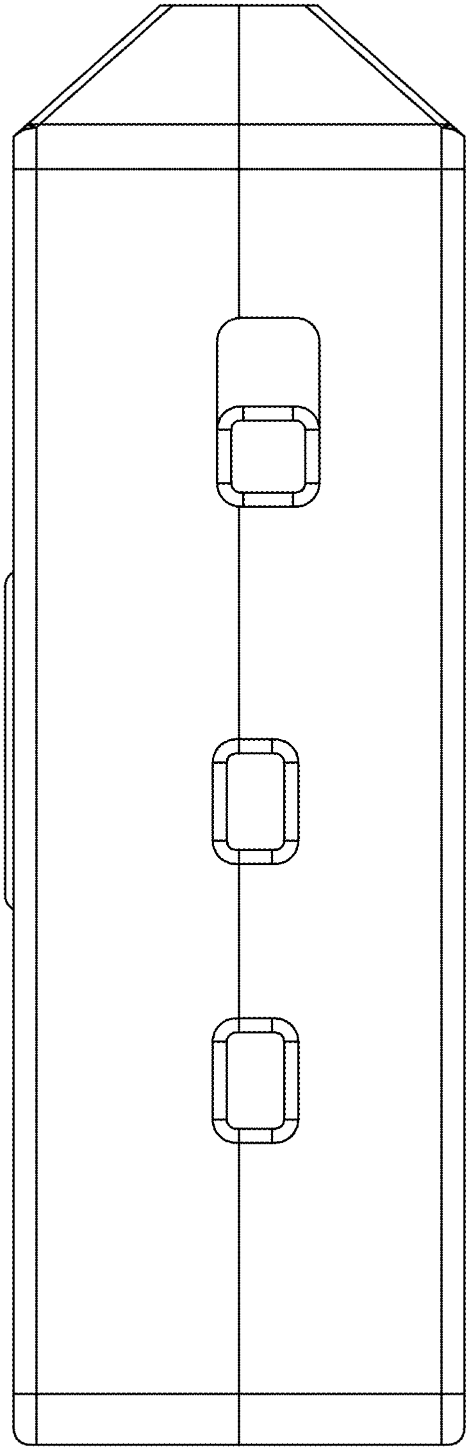
Figure 31:
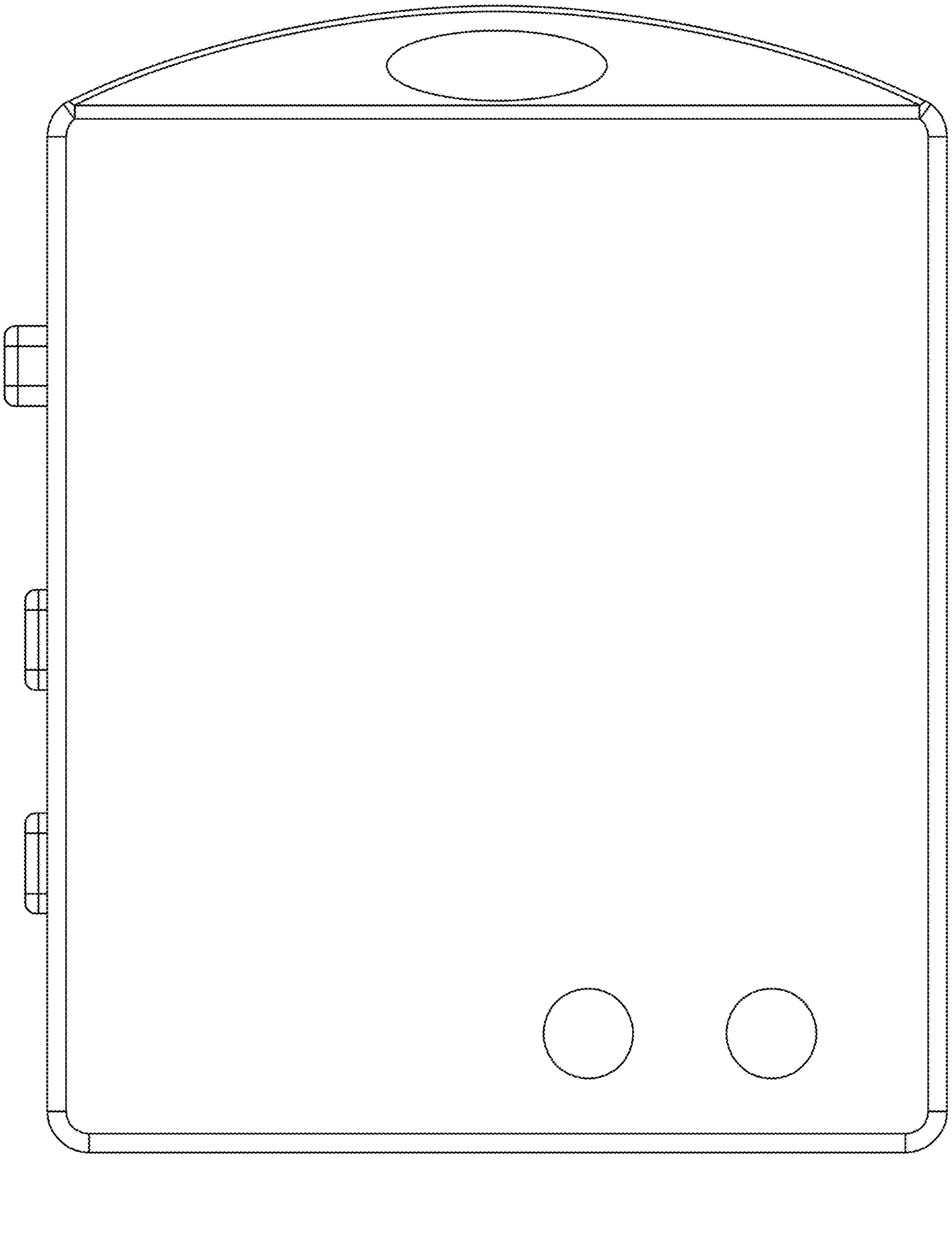
Figure 32:
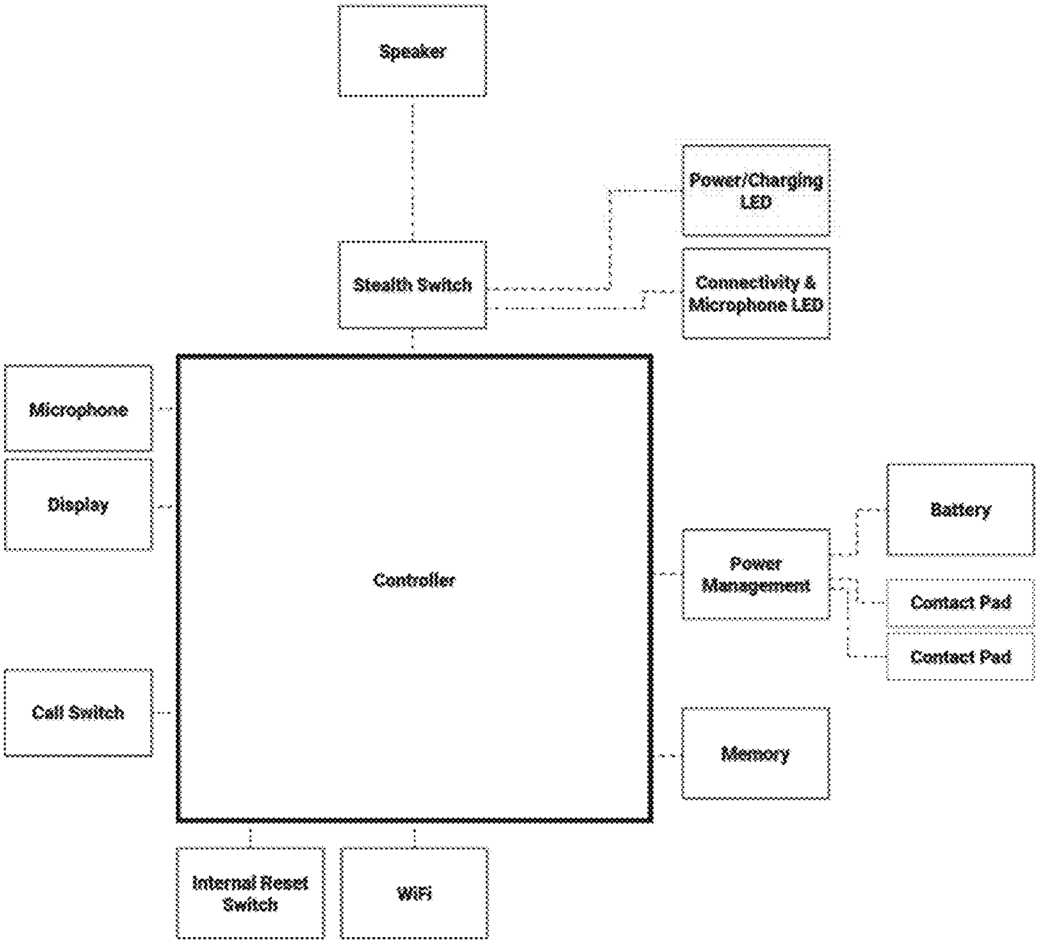
FIG. 32 is a block electrical/electronic schematic diagram for the several of the components and features that can be used for any of the disclosed RIC embodiments.
Figure 33:
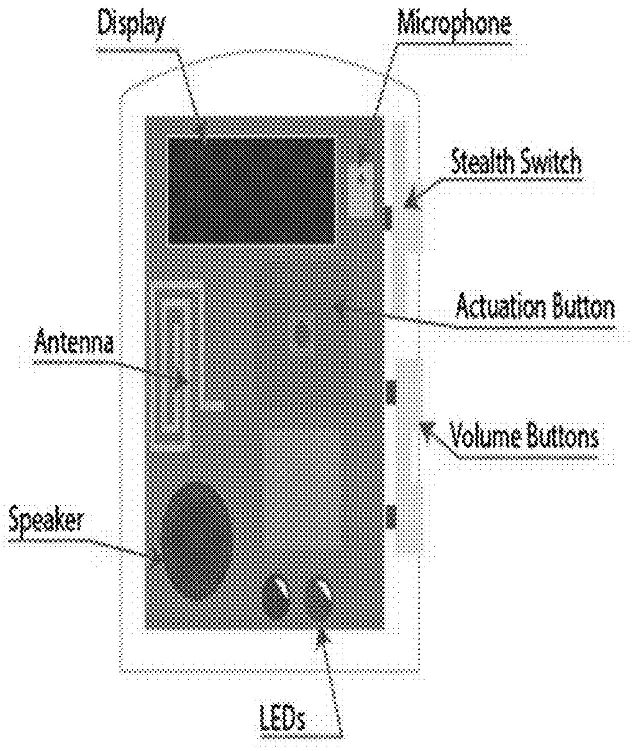
FIGS. 33 and 34 illustrate another non-limiting printed circuit board assembly that can be internally disposed within one or more of the disclosed RIC embodiments.
Figure 34:
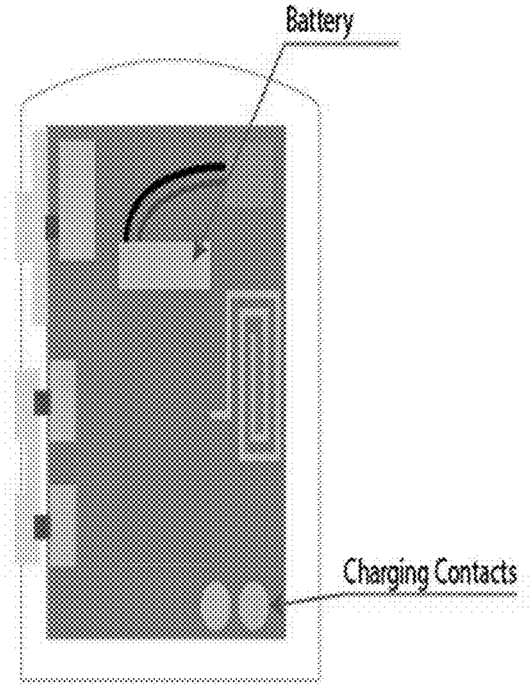
Figure 35A:
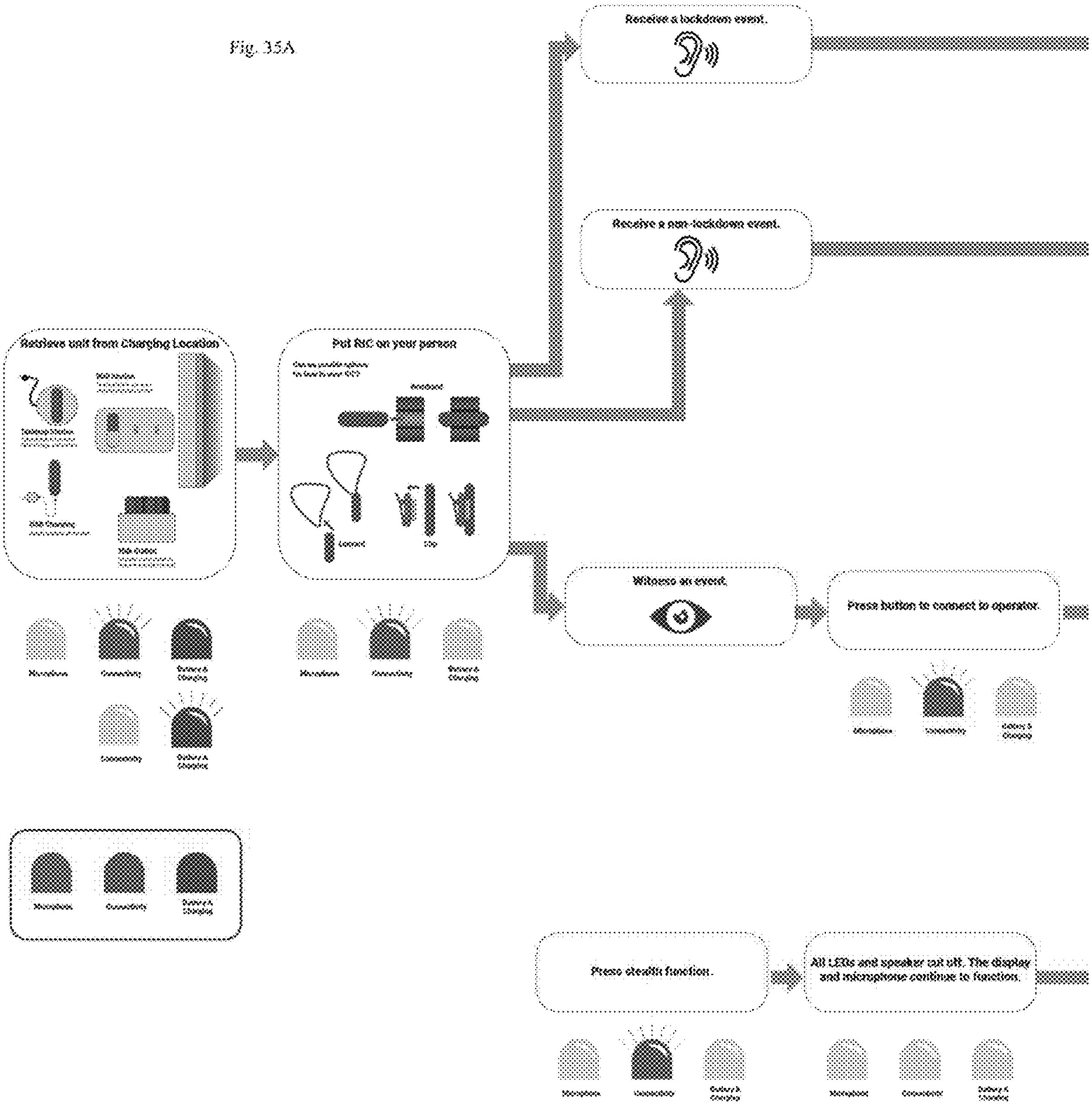
FIGS. 35A, 35B and 35C is a process flow diagram for operation of the RIC device in accordance with the present disclosure.
Figure 35B:
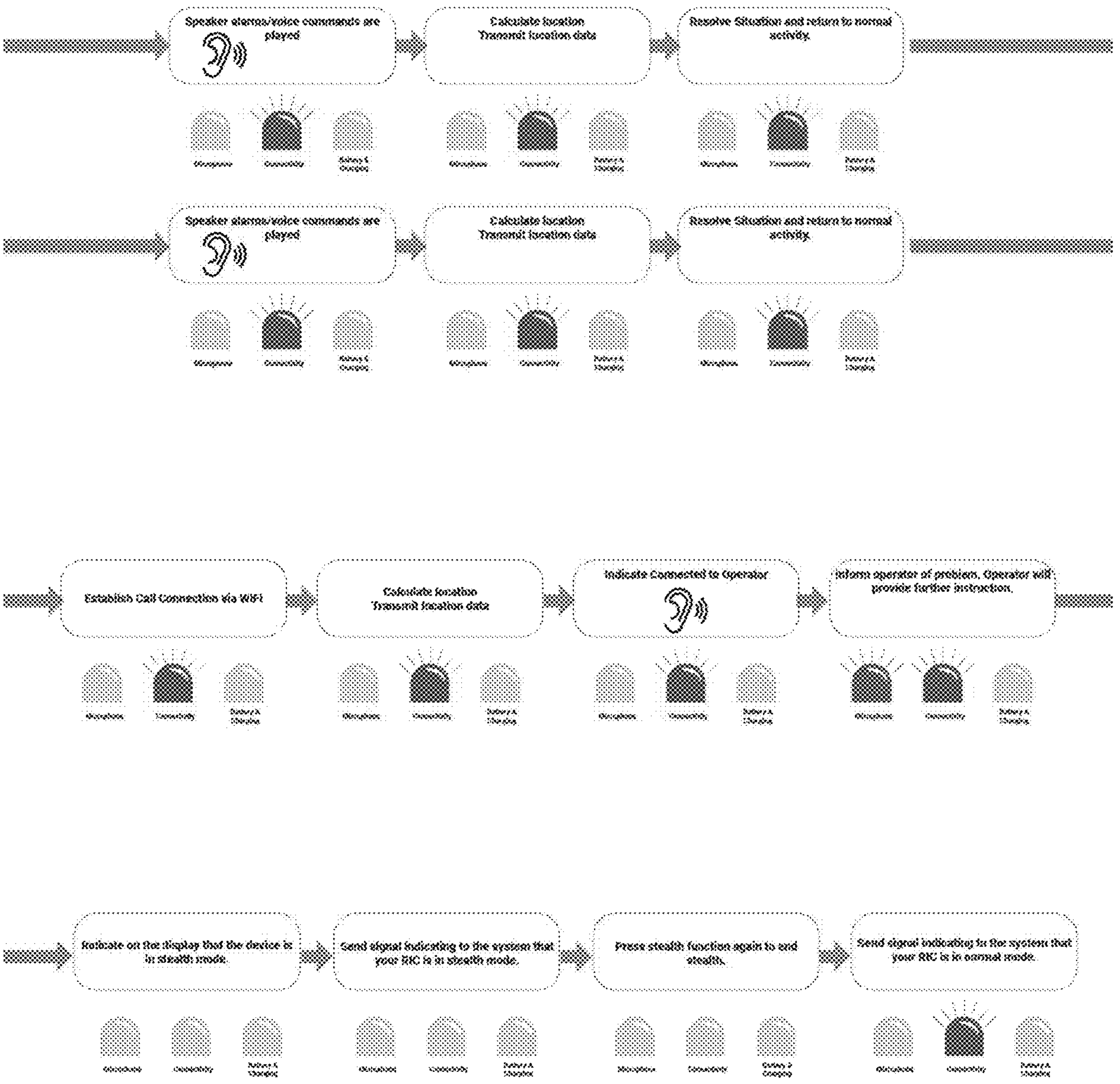
Figure 35C:
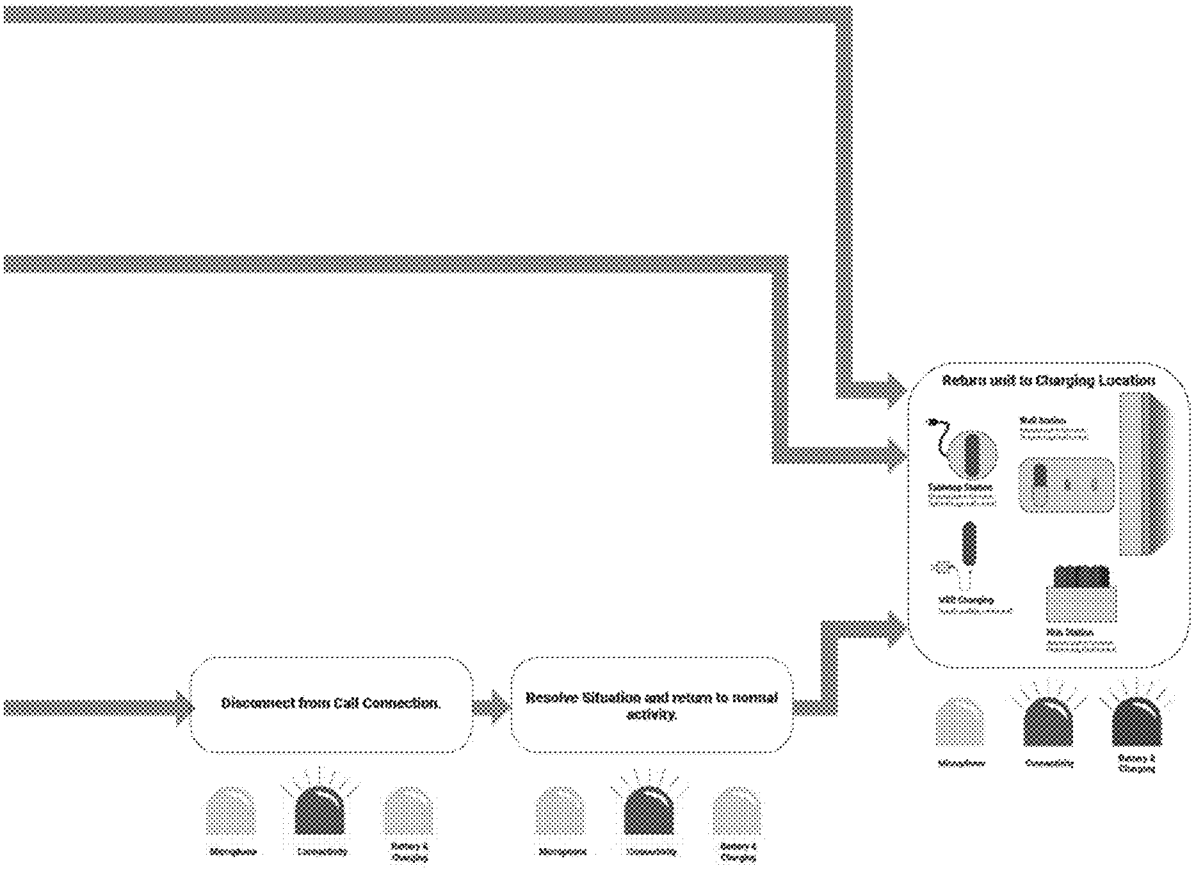

FIGS. 20 and 21 illustrates a non-limiting wall-charger embodiment for charging the RIC, with FIG. 20 showing a non-limiting electrical/electronic circuitry and FIG. 21, shown a non-limiting charger hosing embodiment. In one embodiment, the switch box can receive 110AC and convert it to approximately 5V DC to charge the RIC. The switch plate can include two switches that can provide a digital signal to open and close the light switch circuits, control an electrical outlet, or control some other switch operated electrical circuit. A RJ45 connector can be included to provide outgoing power to other devices.

FIGS. 22A through 22G illustrates a non-limiting embodiment for the RIC device, with FIGS. 22A and 22B showing the RIC device and its various buttons, displays, lights, speakers, etc. FIG. 22C illustrates the preferred, but not limiting, size for the RIC device being able to be easily handheld. FIG. 22D illustrates a non-limiting printed circuit board assembly that can be internally disposed within the device and aligned with the various buttons, openings, speakers, displays, seen in FIG. 22A and FIG. 22B. FIG. 22E shows the RIC device being worn by lanyard. FIG. 22F shows the RIC device about to be stored within the user's shirt pocket and FIG. 22G illustrates the RIC device being clipped to the user's shirt pocket (and can also be clipped at other locations, such as the shirt's neck area).

FIGS. 23A through 23G illustrates another non-limiting embodiment for the RIC device, with FIGS. 23A and 23B showing the RIC device and its various buttons, displays, lights, speakers, etc. FIG. 23C illustrates the preferred, but not limiting, size for the RIC device being able to be easily handheld. FIG. 23D illustrates a non-limiting printed circuit board assembly that can be internally disposed within the device and aligned with the various buttons, openings, speakers, displays, seen in FIG. 23A and FIG. 23B. FIG. 23E shows the RIC device being worn by lanyard. FIG. 23F shows the RIC device about to be stored within the user's shirt pocket and FIG. 23G illustrates the RIC device being clipped to the user's shirt pocket (and can also be clipped at other locations, such as the shirt's neck area).

FIGS. 24A through 24G illustrates a further non-limiting embodiment for the RIC device, with FIGS. 24A and 24B showing the RIC device and its various buttons, displays, lights, speakers, etc. FIG. 24C illustrates the preferred, but not limiting, size for the RIC device being able to be easily handheld. FIG. 24D illustrates a non-limiting printed circuit board assembly that can be internally disposed within the device and aligned with the various buttons, openings, speakers, displays, seen in FIG. 24A and FIG. 24B. FIG. 24E shows the RIC device being worn by lanyard. FIG. 24F shows the RIC device about to be stored within the user's shirt pocket and FIG. 24G illustrates the RIC device being clipped to the user's shirt pocket (and can also be clipped at other locations, such as the shirt's neck area).

FIGS. 25A and 25B further illustrate the RIC embodiment shown in FIGS. 22A and 22B with certain features for this RIC embodiment described underneath. FIGS. 26A and 26B further illustrate the RIC embodiment shown in FIGS. 23A and 23B with certain features for this RIC embodiment described underneath. FIGS. 27A and 275B further illustrate the RIC embodiment shown in FIGS. 24A and 24B with certain features for this RIC embodiment described underneath.

Figure 11:
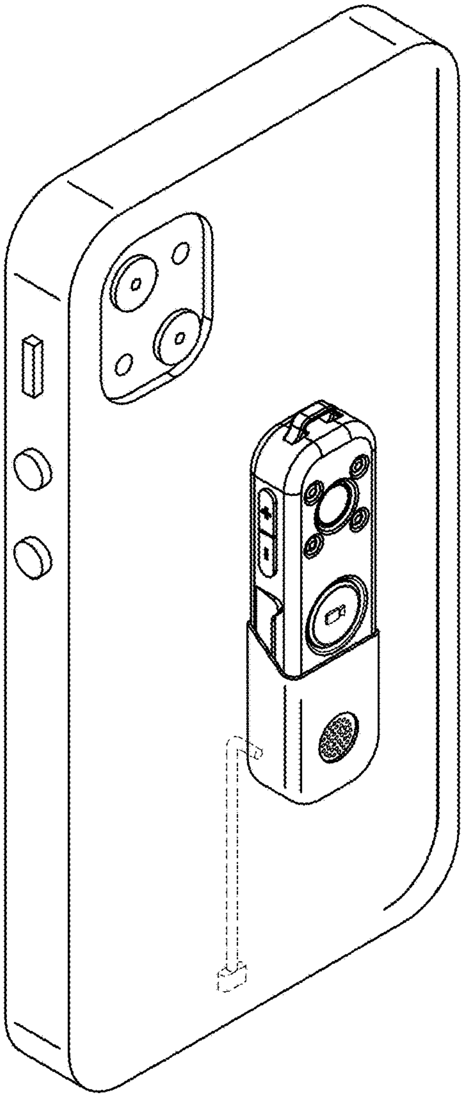
FIG. 11 illustrates a perspective view of a molded RIC docking/charging pocket providing on a cell phone case, with the docking/charging pocket including a charging ribbon connector or other charging connection for electrical communication with a cell phone charging port; an opening can be provided in the pocket that can be aligned with the speaker of the RIC to allow audio from the RIC to be easier herd when the RIC is disposed within the charging pocket. The pocket can also have an external USB-C or other electrical connector/port. As seen, charging can occur from internally in the cell phone case.
Figure 12:
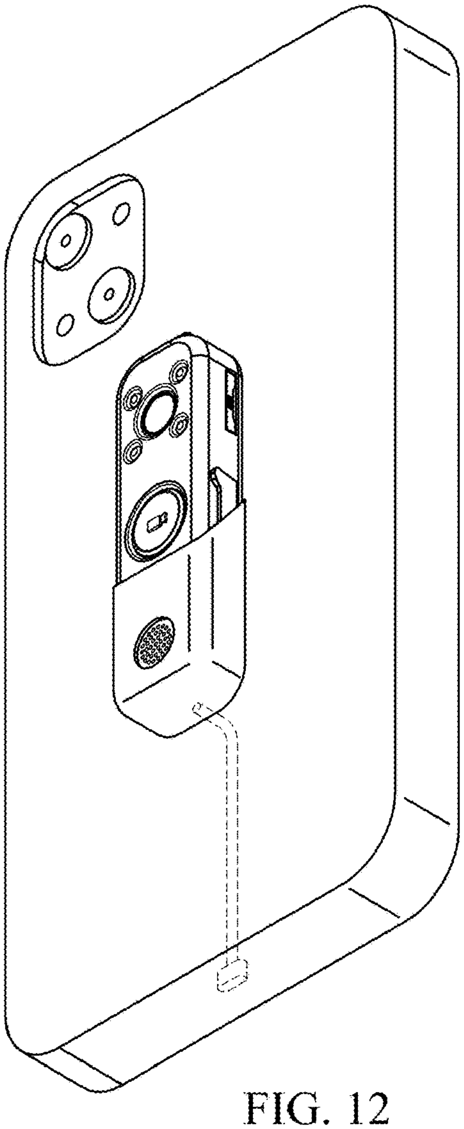
FIG. 12 is another perspective view showing the RIC docking/charging pocket of FIG. 11.
Figure 13:
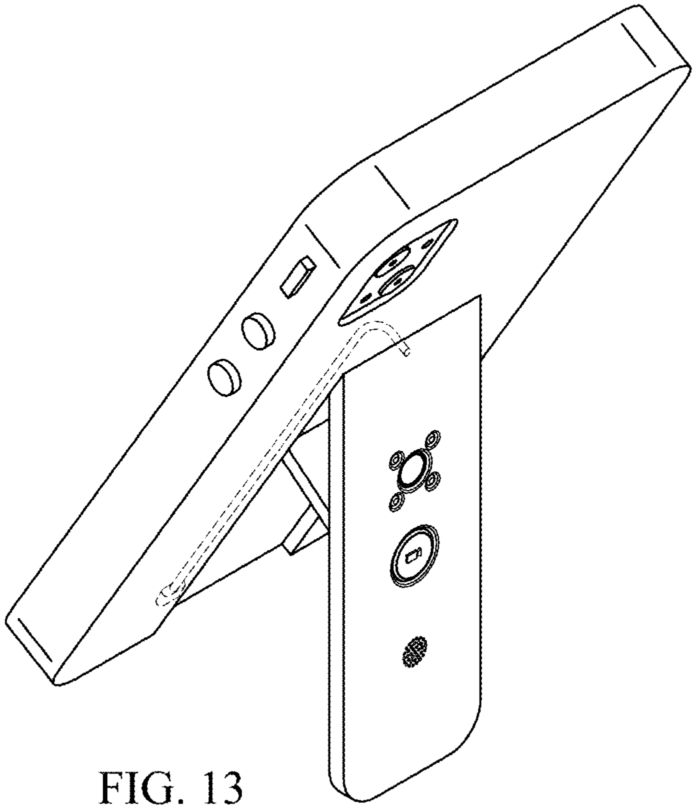
FIG. 13 illustrates a back perspective of another cell phone case that is provided with a cutout for receipt of the RIC device and which provides an embedded charging ribbon connector to an existing cell phone. The camera lens, video record button and speaker component of the RIC are also seen in the drawing figure.
Figure 14:
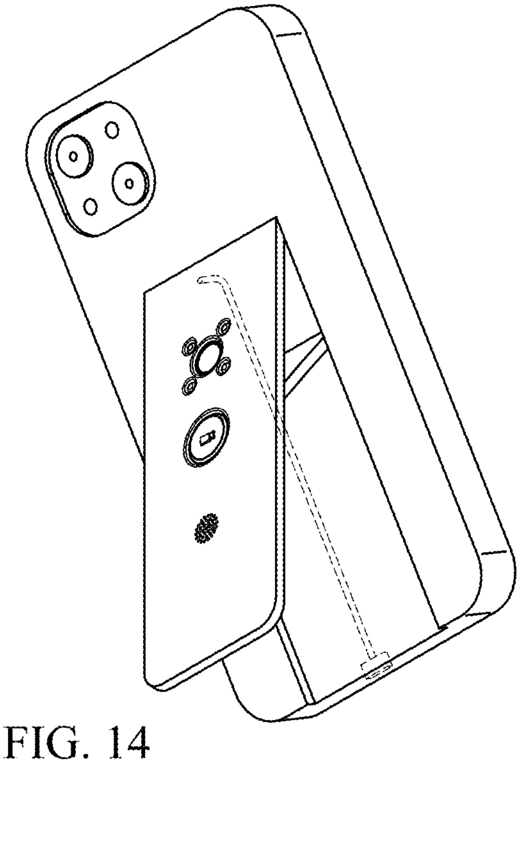
FIG. 14 illustrates a further embodiment of the RIC secured to a cell phone case shown in FIG. 5 showing the built in charging circuit and can also have at a lower edge an external charging USB-C or other electrical charging port.
Figure 15:
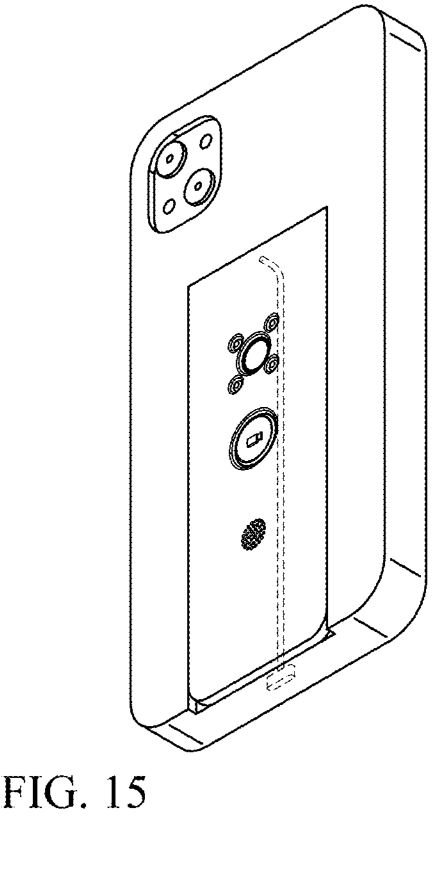
FIG. 15 illustrates a further embodiment of the RIC secured to a cell phone case shown in FIG. 5.
Figure 16:
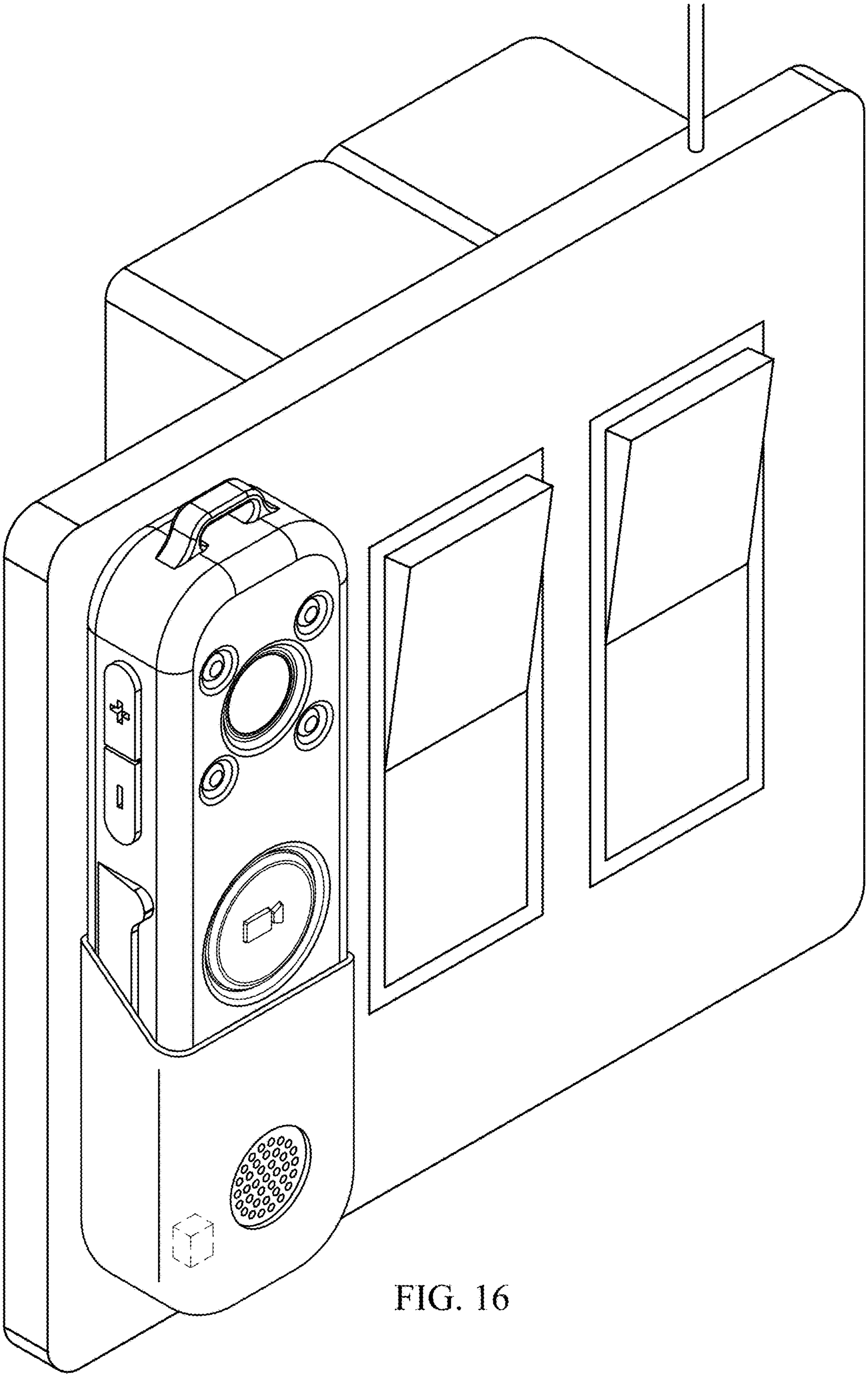
FIG. 16 illustrates another embodiment for charging the RIC where a male charging connector can be embedded into a light switch plate. An existing electrical box is also seen and power of ethernet ("POE") charging circuitry out and/or other circuitry can also be provided for multiple RICS and/or other notification systems and sensors, such as smoke sensors, internet of things ("IOT") devices.

As seen in FIGS. 11 and 12, the remote actuator/communicator (i.e. RIC device) can have a molded cell phone cover or tablet around the device to accommodate a docking/charging area preferably with a hinge to fold-out the device that can then also act as a stand (See FIG. 13).

Figure 17:
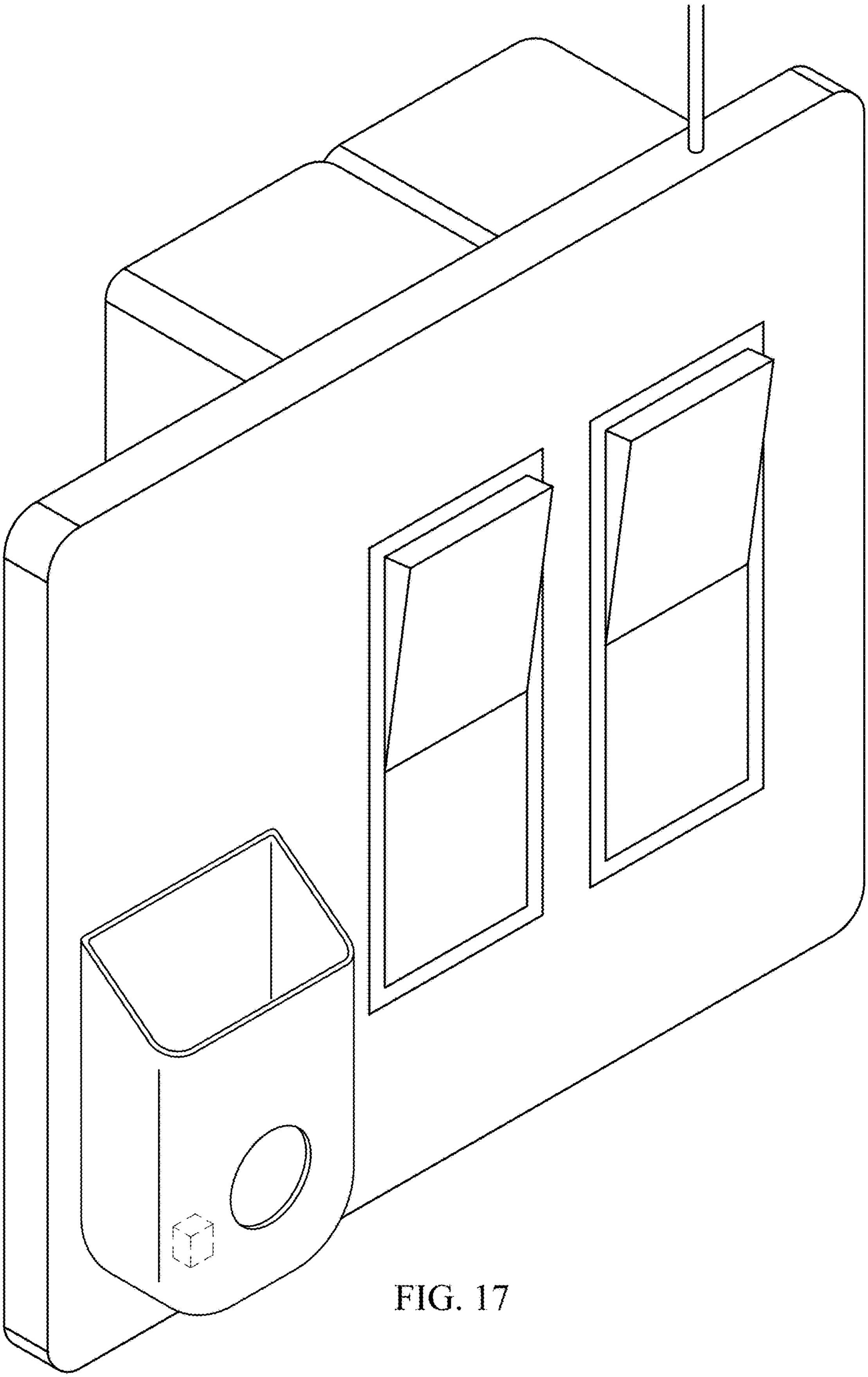
FIG. 17 illustrates the embodiment of FIG. 16 but without the RIC disposed within the charging pocket portion of the light switch plate, with the dotted square representing the male connector.
Figure 18:
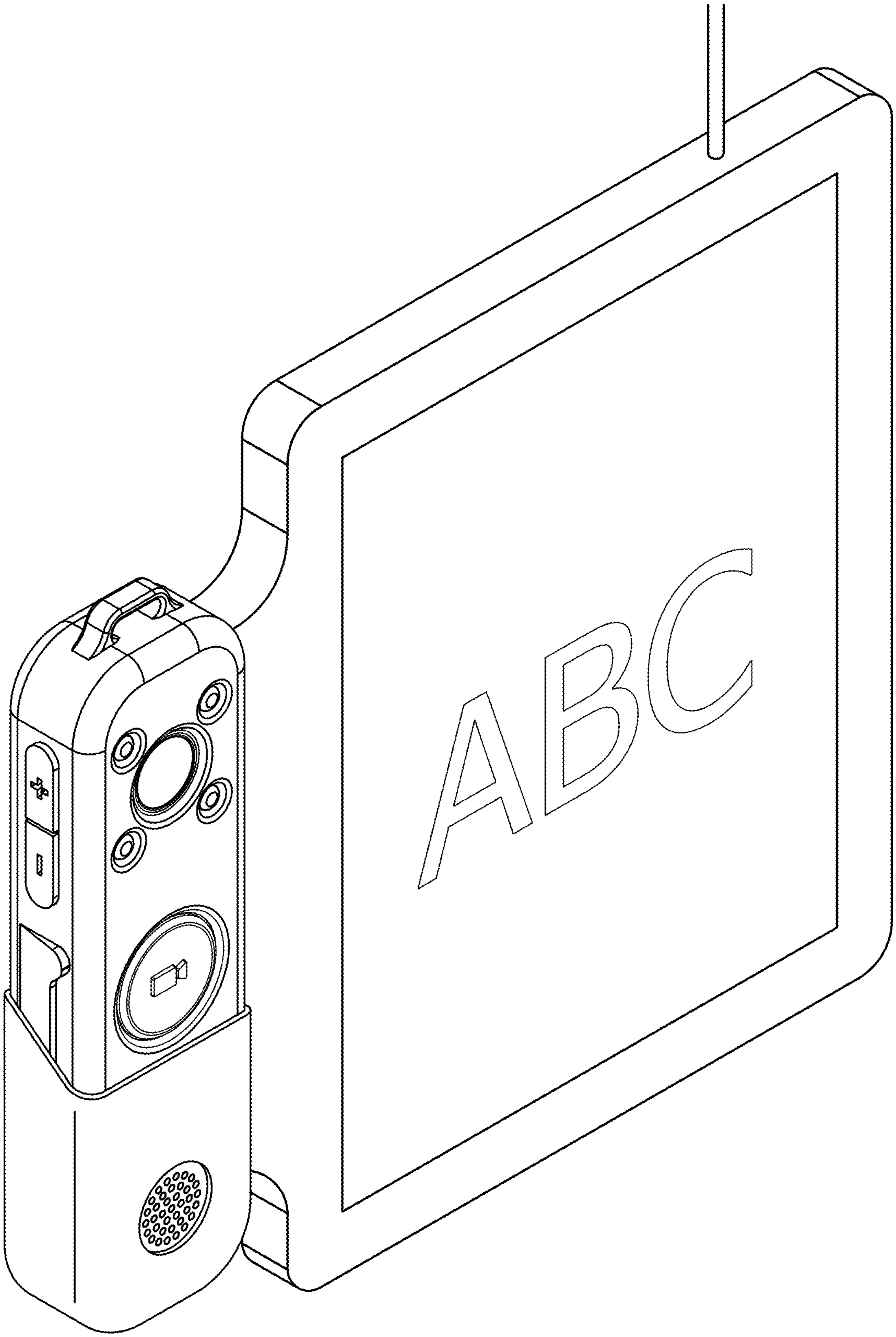
FIG. 18 illustrates a backlit LED touch screen having a CAT 5 POE charging circuit and provided with a pocket and/or charging pocket for storage of the RIC when not in use that can be preferably located on one side of the touch screen. The POE charging circuit out provides for multiple docking/charging of the RIC, other notifiers and electrical/IOT devices.
Figure 19:
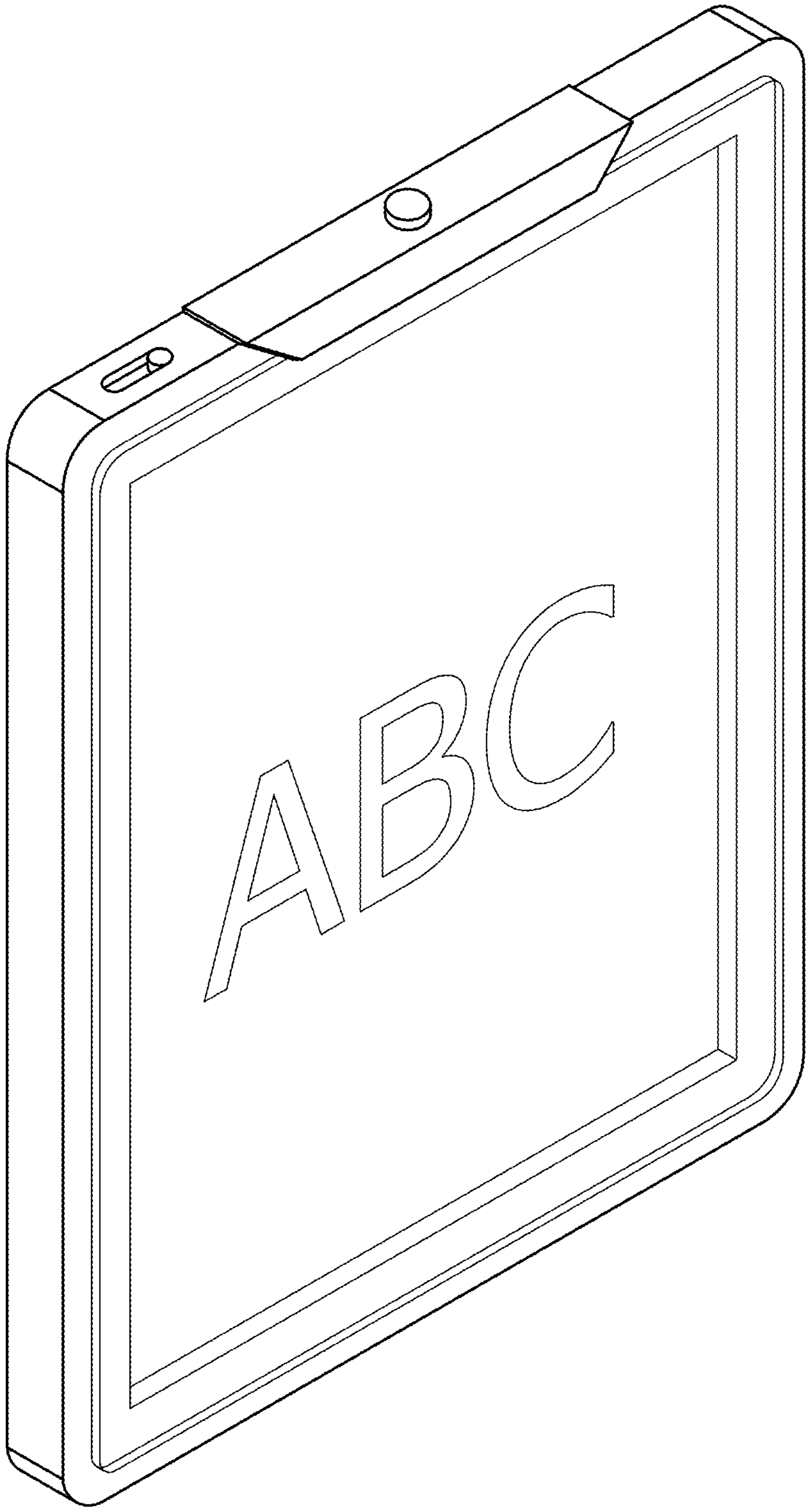
FIG. 19 illustrates a backlit LED screen or digital display backlit dimmer switch preferably on the top left, along with a sliding emergency call button/interior button cover on the top, with the touch screen preferably also being a digital display. The touch screen can be secured to a 2 gang existing electrical box. Also seen is that the screen can have custom graphics and one or more speakers can be provided, such as, without limitation, at the bottom.

The remote actuator/communicator electronics can also be molded into a cell phone case or tablet that has a hinge to fold-out the device that also acts as a stand. As seen in FIGS. 16-19, the remote actuator/communicator can also be docked/charged by incorporating a 2 gang light switch assembly into the embodiment. It can also have a "Power over Ethernet" ("POE") charging circuit out that can charge other POE devices such as, without limitation, other types of notifiers or alert notifier or other smart devices. As seen in FIG. 17 for example, the small box shown in dash can be inside the pockets and can represent a male connector, such that when the RIC devices is slid in the pocket it can mate with a female connector on bottom of RIC device, in order to charge the RIC device.

In certain embodiments, a molded sleeve around the bottom of the RIC device can be provided, with male charging connector inside.

The remote RIC unit/device can also be programmed to different operational modes such as just Push-to Talk PTT only or full emergency PTT mode.

The RIC device can also be configured to be paired to a mobile smart device (i.e.-mobile phone, etc.), thus to provide the ability for the RIC device to capture and transmit up to 15 seconds (though not limited to 15 seconds and larger and small amounts of time can be used and considered within the scope of the disclosure) of audio using a mobile app that is always active on the smart device. Thus, the captured audio describes the nature of the emergency to eliminate the need for a 911 dispatch to interact directly with the person needing help. For this embodiment, the app on the mobile device can pair with the RIC device and continuously monitors the panic button or other alert or designated button (collectively "panic button") on the RIC device. The panic button on the RIC initiates a call to 911. When the user presses the panic button on the RIC device, they can verbally describe the nature of their emergency which is captured and stored in the RIC. The app can have location services running so any 911 notification will transmit the location as well as the captured audio stream recorded stored in the RIC device. Emergency personnel monitoring 911 will have immediate access to the location and audio description of the emergency without having to interact directly with the person who pressed the panic button on the RIC.

This same functionality can also be implemented without a RIC device by using a smart watch that paired with the mobile device. The RIC device or smart watch can have real time communication with the mobile device app and can be provided with a built in microphone that could record the audio stream describing the nature of the emergency.

The RIC device can be a relatively small (approximately 2"×3" in a preferred non-limiting embodiment) device that can be carried around to provide emergency response with just the click of a button.

For all embodiments, certain novel features, benefits and/or advantages of the wearable remote incident communicator can include, without limitation:

1. In any emergency or other situation, the communicator allows the user to instantly communicate with or to a monitoring company or the administrative office to report activity or any other desired personnel, such as, first responders. In one non-limiting example, the user can press and hold the RED record button (though other colors can also be used and are considered within the scope of the disclosure) for 3 seconds (though other time periods can also be used and are considered within the scope of the disclosure) to begin the recording and/or wireless transmittal of a message, the event and/or start live stream video mode. Other functions can also be configured to begin or initiated by the pressing of the button. Non-limiting example messages and key words can include-"Police Emergency" "Active Shooter Emergency" "Medical Emergency" "Student Fight", "Fire", etc.

2. Once an emergency and/or other triggering event is declared, one or more, and preferably all other, RICs in the building and/or associated with the premises (i.e. school playground, school outdoor basketball court, etc.) can begin to flash a blue LED (though other colors can be used and are considered within the scope of the disclosure) and vibrate. Other notifiers, such as wall-mounted notifiers residing in docking stations, can also be triggered. Preferably, the other RICs are worn or carried by other individuals associated with the school or other operation (i.e. governmental, business, etc.) located within the building and those individuals can remove their associated RIC from their belts or lanyard and put the unit up to their ears to listen to the message that was recorded from the primary user. If events are also occurring at their specific location, such other individuals can also begin to record/stream/broadcast video/images/audio from their particular locations.

3. A button on the side of the communicator (or other location on the communicator) can be pushed by the user to talk with others using a two-way communication feature.

4. A port on the side of the communicator (or other location on the communicator) can be provided and can be used for a USB-C connector to recharge the unit. Other types of recharging ports can also be included and are considered within the scope of the disclosure and other uses for the port(s), in addition to recharging the communicator.

5. The communicator can be provided with a built-in microphone and speaker.

6. The communicator can be provided with a light bulb which when activated can signal that an incident has occurred or is occurring. In one non-limiting embodiment, the light bulb can be a Blue LED to alert incident, though other types of bulbs and colors for the bulb can also be used and are considered within the scope of the disclosure.

7. Preferably, an unlimited number of RIC units can be paired with an instant video alert notifier for an emergency notification system, with the instant video alert notifiers preferably located in hallways, foyers, main entrance and exits (i.e. in non-classroom locations as the RICs can be preferably worn by teachers, administrators, aides, student(s), doctors, nurses, resource officers, campus security, etc. in the classrooms in a preferred non-limiting embodiment) for the schools or other buildings. The RIC units can also be paired with other devices such as smart smoke alarms, defibrillators (wherein remove a defibrillator alerts medical personnel through the RIC communication that a medical emergency is occurring), etc. to create a highly effective security/safety mesh-network.

8. The back of the RIC unit (or other location on the unit) can be provided with a stealth mode button.

9. The RIC unit can be Geo-Tagged so Police and first responders can track the movement in a building. Additionally, video and images that are streamed and broadcasted remotely to others can also be geo-tagged so that the reviewing individuals know exactly where the incident is occurring within the building/premises.

10. The RIC unit has a belt clip or a ring on the top to connect to a lanyard for personal use. The RIC unit/device can also have a cloth or other material cover that incorporates a VELCO locking backing to adhere to clothing such as, without limitation, hospital scrubs or uniforms so as not to interfere with the user's abilities to perform work or other responsibilities.

11. As referenced above, preferably the RIC unit can be provided with a rechargeable battery, though such is not considered limiting and non-rechargeable batteries can also be used and are considered within the scope of the disclosure.

Though above characteristics are provided by way of example only and are not considered limiting and other characteristics, features, ratings, dimensions, values, uses, etc. can be used and are also considered within the scope of the disclosure.

Additional features provided with one or more of the RIC embodiments includes:

a. pushing an activation button on the RIC device for either a short or a long time period to initiate video or PTT;

b. remote trigger device and providing for a video-recording of the conditions at the emergency location prior to the alarm being activated on the RIC device and/or capturing a snap shot of such pre alarm conditions;

c. use of a single button to cause differing actions (press to hold for voice, short press to send an alert etc.);

d. in some schools or other buildings, particularly older construction and multi-level, GPS may not work so well, "beaconing" using Bluetooth or Wi-Fi to provide accurate location information—particularly, though not limiting for the remote trigger;

e. in larger schools or other situations where a "one-notifier/communicator goes/all-notifiers/communicators go" alert might cause the video streams to overwhelm the Wi-Fi or legacy RF systems. There the RIC device can be configured to provide the following method/steps, i) back-off the frame rate or video definition; or ii) instead of one-goes/all go, establish a method of grouping the emergency notification devices so that only adjacent or same-floor devices trip following the initial activation;

f. the remote actuator/communicator can have a molded cell phone cover or tablet around the device to accommodate a docking/charging area with a hinge to fold-out the device that also acts as a stand;

g. the remote actuator/communicator electronics can also be molded into a cell phone case or tablet that has a hinge to fold-out the device that also acts as a stand;

h. the remote actuator/communicator can also be docked/charged by incorporating a 2 gang light switch assembly into the embodiment and can also have a "Power over Ethernet" (POE) charging circuit out that can charge other POE devices such as, but not limited to, my above-identified Instant Video Alert Notifier or other emergency notifiers or other smart devices;

i. The RIC device can be paired with a cellular device that has an emergency app installed can communicate with via RIC to actuate an alert and record 4 seconds (though not limited to 4 seconds) of audio declaration of an emergency. The RIC can also receive pre-recorded responses "Police are on their way". The cellphone and the RIC can be paired by Bluetooth, WIFI, hot spot etc. and other know or future pairing technologies. The messages and information can also be provided by sound or text response only;

j. The RIC device can be configured or have language translation software and key word recognition actuation such as "Help Police", "Medical Emergency" etc.

Features described for one embodiment are also considered to be available and/or used in other described and/or shown embodiment for the RIC, charging methods, etc. and are thus the features, uses, components, etc. for all other embodiments are incorporated by reference for each embodiment.

It should be understood that the exemplary embodiments described herein should be considered in a descriptive sense only and not for purposes of limitation. Where multiple embodiments are disclosed, descriptions of features or aspects within each embodiment should typically be considered as available for other similar features or aspects in other embodiments. While one or more embodiments have been described with reference to the figures, it is understood that various changes in form and details may be made therein without departing from their spirit and scope and such changes are considered within the scope of the disclosure.

All parts/components of the wearable remote incident communicator and their locations, wiring, powering means, charging means, wireless communication means and technology; recording means, storage means, broadcasting means, mechanical and/or electrical communications between parts/components and/or devices, attachment or securement mechanisms, dimensions, values, ratings, shapes, colors, materials, etc. discussed above or shown in the figures, if any, are merely by way of example and are not considered limiting and other component(s) and their locations, wiring, powering means, charging means, wireless communication means and technology, recording means, storage means, broadcasting means, mechanical and/or electrical communications between parts/components and/or devices, attachment or securement mechanisms, dimensions, values, ratings, shapes, colors materials, etc. can be chosen and used and all are considered within the scope of the disclosure.

The benefits, advantages, solutions to problems, and any element(s) that may cause any benefit, advantage, or solution to occur or become more pronounced are not to be construed as a critical, required, or essential features or elements of any or all the future claims.

While the wearable remote actuator and incident communicator has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. An incident or emergency incident communicator device designed to be worn, carried or on the person of an individual for easy access by the individual during an incident or emergency situation, the indication device in wireless communication with a notification system, the indication device comprising:

a housing;

a camera module incorporated within the housing;

an activation button incorporated within the housing;

a switch;

an electronic/electrical circuitry disposed within the housing configured to operate the camera module and in electrical communication with the switch, the electronic/electrical circuitry including wireless communication technology;

wherein pressing the activation button by the user causes the activation button to contact the switch to initiate an activation signal; and a speaker and microphone incorporated into the housing and in communication with the electronic/electrical circuitry;

wherein the electronic/electrical circuitry is configured to recognized pressing of the activation button for a predetermined time period to enable a Push-to-Talk mode;

wherein, upon occurrence of an incident or emergency at a geographic location or structure where the user is located, pressing the activation button: (i) automatically activates the camera module; (ii) transmits a first wireless communication indicating an emergency event; (iii) transmits a second wireless communication including location information; and (iv) wirelessly activates a plurality of additional notification devices located at the geographic location or structure such that the additional notification devices begin recording or streaming video from respective locations within the structure.

2. The indication device of claim 1 further comprising a clip for securing the device to clothing or an accessory.

3. The indication device of claim 1 further comprising a loop member for securing a lanyard or cord.

4. The indication device of claim 1 wherein the device communicates with one or more components of a notification system located locally at or remote from the geographical location or.

5. The indication device of claim 1 wherein the electronic/electrical circuitry is configured to transmit video recorded by the camera module.

6. The indication device of claim 1 wherein the first wireless communication and the second wireless communication are transmitted as separate sequential communications.

7. The indication device of claim 6 wherein the second wireless communication is transmitted after a predetermined delay.

8. The indication device of claim 1 wherein activation of the camera module causes automatic recording of a predefined duration audio and/or video file that is automatically transmitted to a remote monitoring system.

9. The indication device of claim 8 wherein the device transitions from the predefined duration recording to continuous live-streaming.

10. The indication device of claim 1 further comprising a stealth mode in which visible and audible indicators are disabled while maintaining communication.

11. The indication device of claim 10 wherein the device continues to receive communications while in stealth mode.

12. The indication device of claim 1 wherein the activation button must be pressed a predetermined number of times within a predefined time interval to initiate the emergency communication.

13. The indication device of claim 1 wherein the wireless communication causes activation of a building lockdown protocol.

14. The indication device of claim 1 further comprising a cellular communication module including a SIM card enabling direct communication with a remote monitoring system independent of a local system.

15. The indication device of claim 1 wherein the wireless communication is configured to interface with first responder communication systems.

16. A method for virtual instantaneous notification of an emergency event, comprising:

a. providing an indication device on the person of an individual;

b. detecting activation of an activation button on the indication device and automatically activating a camera module;

c. transmitting a first wireless communication indicating an emergency;

d. transmitting a second wireless communication including location data and wirelessly communicating with one or more additional notification devices located at the geographical location or structure;

automatically activating the one or more additional notification devices to begin recording or streaming video from respective locations within or at the geographical location or structure.

17. The method of claim 16 further comprising automatically recording a predefined duration audio and/or video file and transmitting the file.

18. The method of claim 17 further comprising transitioning to live-streaming after transmission of the predefined duration file.

19. A system for emergency notification and situational awareness, comprising:

a wearable incident communicator device including a camera module, activation button, and wireless communication circuitry; and a plurality of distributed notification devices positioned throughout a structure;

wherein activation of the wearable incident communicator device causes transmission of an emergency signal and location data; and wirelessly activates the plurality of distributed notification devices to begin recording or streaming video from multiple locations within the structure to provide multi-location situational awareness.

20. The system of claim 19 wherein the wearable device further transmits a predefined duration audio and/or video file prior to initiating live-streaming.

* * * * *